US012743844B2

(12) United States Patent
Vianello et al.

(10) Patent No.: US 12,743,844 B2

(45) Date of Patent: Sep. 22, 2026

(54) SYSTEM AND METHOD FOR 3D MODELING

(71) Applicant: Cape Analytics, Inc., Palo Alto, CA (US)

(72) Inventors: Giacomo Vianello, Mountain View, CA (US); Peter Lorenzen, Mountain View, CA (US); Yirui Jiang, Palo Alto, CA (US)

(73) Assignee: Cape Analytics, Inc., Palo Alto, CA (US)

( * ) Notice: Subject to any disclaimer, the term of this patent is extended or adjusted under 35 U.S.C. 154(b) by 136 days.

(21) Appl. No.: 18/429,868

(22) Filed: Feb. 1, 2024

(65) Prior Publication Data

US 2024/0265630 A1 Aug. 8, 2024

Related U.S. Application Data

(60) Provisional application No. 63/442,795, filed on Feb. 2, 2023.

(51) Int. Cl.

*G06T 17/00* (2006.01)
*G06V 10/25* (2022.01)
*G06V 10/44* (2022.01)

(52) U.S. Cl.

CPC .............. *G06T 17/00* (2013.01); *G06V 10/25* (2022.01); *G06V 10/44* (2022.01); *G06V 2201/07* (2022.01)

(58) Field of Classification Search

CPC ..... G06T 17/00; G06T 2210/04; G06V 10/25; G06V 10/44; G06V 2201/07; G06V 20/176; G06F 30/13; G06F 30/23; G06F 30/27; G06Q 10/06; G06Q 10/103; G06Q 30/0201; G06Q 30/0278; G06Q 30/0282; G06Q 30/0283; G06Q 50/16; G06Q 50/26

See application file for complete search history.

(56) References Cited

U.S. PATENT DOCUMENTS 8,078,436 B2 * 12/2011 Pershing ................. G06T 7/337 703/2
8,731,234 B1 * 5/2014 Ciarcia ............ G06V 30/19173 382/155
11,392,728 B2 * 7/2022 Porter ...................... G06F 30/17
11,631,235 B2 * 4/2023 Vianello ............ G06Q 30/0278 382/154
11,861,843 B2 * 1/2024 Portail .................. G06F 16/587

(Continued)

OTHER PUBLICATIONS

Hammoudi, K.; Dornaika, F. A Featureless Approach to 3D Polyhedral Building Modeling from Aerial Images. Sensors 2011, 228-259 (Year: 2011).*

(Continued)

*Primary Examiner* — Motilewa Good-Johnson

(74) *Attorney, Agent, or Firm* — Polsinelli PC

(57) ABSTRACT

In variants, the method for 3D modeling can include: determining a property of interest, determining property information for the property of interest, determining property component parameter values based on property information, determining a 3D model based on property component parameter values, and optionally determining a set of property attributes. However, the method can additionally and/or alternatively include any other suitable elements.

21 Claims, 16 Drawing Sheets

(56) References Cited

U.S. PATENT DOCUMENTS

| | | | | |
|---|---|---|---|---|
| 12,164,839 | B2 * | 12/2024 | Porter | G06F 30/13 |
| 2004/0105573 | A1 * | 6/2004 | Neumann | G06T 17/00 382/103 |
| 2013/0262530 | A1 * | 10/2013 | Collins | G06Q 40/08 707/812 |
| 2014/0177945 | A1 * | 6/2014 | Pershing | G06F 30/13 382/154 |
| 2016/0217153 | A1 * | 7/2016 | Hendrey | G06T 11/20 |
| 2017/0076438 | A1 * | 3/2017 | Kottenstette | G06V 20/176 |
| 2018/0018815 | A1 * | 1/2018 | Morovic | B33Y 50/00 |
| 2019/0138666 | A1 * | 5/2019 | Pershing | G06F 30/13 |
| 2019/0384866 | A1 * | 12/2019 | Porter | G06F 30/17 |
| 2021/0142577 | A1 * | 5/2021 | Thomas | G06T 3/18 |
| 2021/0174580 | A1 * | 6/2021 | Mundy | G06T 15/06 |
| 2021/0248279 | A1 * | 8/2021 | King | G06T 17/20 |
| 2021/0256180 | A1 | 8/2021 | Austern et al. | |
| 2021/0319059 | A1 * | 10/2021 | Vianello | G06N 3/0464 |
| 2023/0026278 | A1 * | 1/2023 | Vianello | G06Q 30/0278 |
| 2023/0143198 | A1 * | 5/2023 | Vianello | G06Q 30/0278 705/315 |
| 2023/0169731 | A1 * | 6/2023 | Strader | G06F 30/13 345/419 |
| 2023/0230250 | A1 * | 7/2023 | Vianello | G06F 16/587 382/159 |
| 2023/0394033 | A1 * | 12/2023 | Dua | G06F 16/2365 |
| 2023/0419501 | A1 * | 12/2023 | Buczkowski | G06V 10/776 |
| 2024/0011917 | A1 * | 1/2024 | Scharf | B64G 1/1028 |
| 2024/0029352 | A1 * | 1/2024 | Wan | G06F 30/13 |
| 2024/0087290 | A1 * | 3/2024 | Hedges | G06V 20/188 |
| 2024/0176921 | A1 * | 5/2024 | Strader | G06T 15/60 |
| 2024/0251463 | A1 * | 7/2024 | Mundy | G06F 30/13 |
| 2024/0265630 | A1 * | 8/2024 | Vianello | G06F 30/23 |

OTHER PUBLICATIONS

Avrahami, Yair , et al., "A Polygonal Approach for Automation in Extraction of Serial Modular Roofs", Photogrammetric Engineering & Remote Sensing, Nov. 2008., figures , 1 10, 1, p. 1366, col. 2, paragraph-7 p. 1368, col. 1, paragraph 3, p. 1372, col. 1, paragraph 3—p. 1373.

Aslani, Mohammad , et al., "Automatic identification of utilizable rooftop areas in digital surface models for photovoltaics potential assessment", Applied Energy 306 (2022) 118033, available online Oct. 20, 2021.

Demir, N. , et al., "Automated Modeling of 3D Building Roofs Using Image and Lidar Data", ISPRS Annals of the Photogrammetry, Remote Sensing and Spatial Information Sciences, vol. I-4, 2012 XXII ISPRS Congress, Aug. 25-Sep. 1, 2012, Melbourne, Australia.

Gui, Shengxi , et al., "Automated LoD-2 model reconstruction from very-high-resolution satellite-derived digital surface model and orthophoto", ISPRS Journal of Photogrammetry and Remote Sensing 181 (2021) 1-19, available online Sep. 13, 2021.

Murtiyoso, Arnadi , et al., "Automatic Workflow for Roof Extraction and Generation of 3D CityGML Models from Low-Cost UAV Image-Derived Point Clouds", ISPRS Int. J. Geo-Inf. 2020, 9, 743; www.mdpi.com/journal/ijgi, published Dec. 12, 2020.

Ortner, Mathias , et al., "Building Extraction from Digital Elevation Model", RR-4517, Inria. 2002. inria-00072071, submitted May 23, 2006.

Partovi, T. , et al., "Statistical Building Roof Reconstruction From Worldview-2 Stereo Imagery", The International Archives of the Photogrammetry, Remote Sensing and Spatial Information Sciences, vol. XL-3/W2, 2015, PIA15+HRIGI15—Joint ISPRS conference 2015, Mar. 25-27, 2015, Munich, Germany.

Ren, Jing , et al., "Intuitive and Efficient Roof Modeling for Reconstruction and Synthesis", ACM Trans. Graph., vol. 40, No. 6, Article 249. Publication date: Dec. 2021.

Sabariego, Natália , et al., "Modeling of Roofs From Point Clouds Using Genetic Algorithms", Bulletin of Geodetic Sciences. 26(1): e2020004, 2020.

Sakunarunphet, Thanabordee , "Roof detection on 3D Mesh Building Model Generate from High-Resolution Oblique Image", Thesis submitted in partial fulfillment of the Requirement for Master of Science in Geoinformatics, Burapha University 2020.

Sellan, Silvia, et al., "Developability of Heightfields via Rank Minimization", ACM Trans. Graph., vol. 39, No. 4, Article 109. Publication date: Jul. 2020.

Youssef, A. , et al., "Using Free Lidar Data with Aerial Photogrammery Images for Construction of 3D Building Models for Openstreetmap", Mar. 2020 IOP Conference Series Materials Science and Engineering 753(3):032081.

* cited by examiner

3D Model $\approx \sum_i T_i ( \quad )$

SYSTEM AND METHOD FOR 3D MODELING

CROSS-REFERENCE TO RELATED APPLICATIONS

This application claims the benefit of U.S. Provisional Application No. 63/442,795 filed 2 Feb. 2023, which is incorporated in its entirety by this reference.

TECHNICAL FIELD

This invention relates generally to the property analysis field, and more specifically to a new and useful system and method for 3D modeling in the property analysis field.

DETAILED DESCRIPTION

The following description of the embodiments of the invention is not intended to limit the invention to these embodiments, but rather to enable any person skilled in the art to make and use this invention.

1. OVERVIEW

Figure 1:
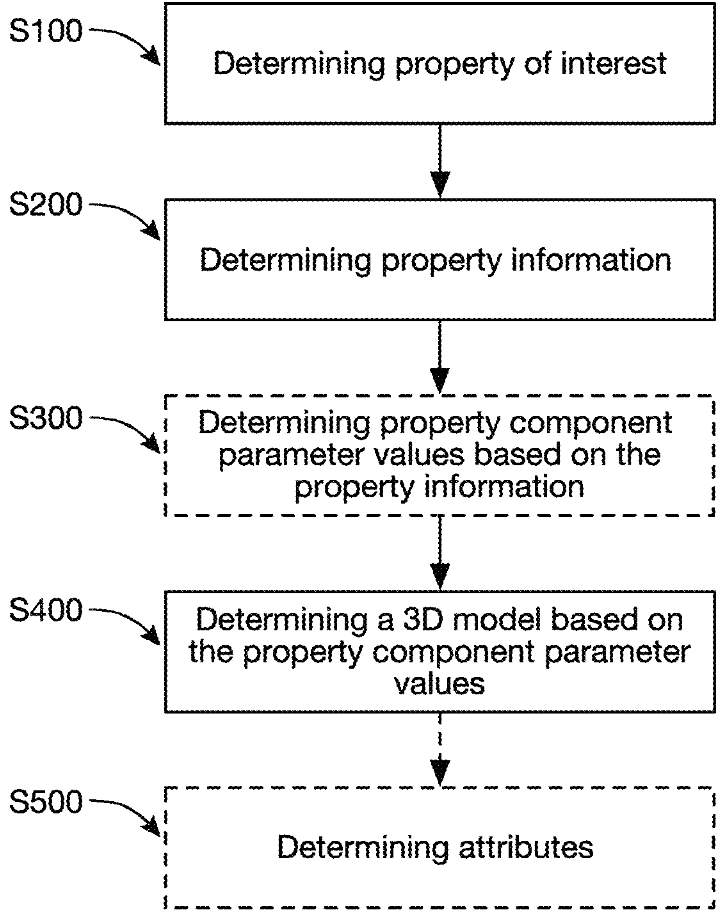
FIG. 1 is a schematic representation of a variant of the method.

As shown in FIG. 1, the method for 3D modeling can include: determining a property of interest S100, determining property information for the property of interest S200, determining property component parameter values based on property information S300, determining a 3D model based on property component parameter values S400, and optionally determining a set of property attributes S500. The property component is preferably a roof, but can additionally or alternatively be other property components or subcomponents. However, the method can additionally and/or alternatively include any other suitable elements.

The method can function to reconstruct a 3D model for a property based on measurements sampled of the property. In an example, the method can reconstruct a 3D roof model for a property, based on measurements of the property. Roof attributes, such as number of facets, number of edges, pitch per face, dominant pitch, average pitch, and/or other attributes can optionally be extracted from the 3D roof model.

2. EXAMPLES

Figure 2:
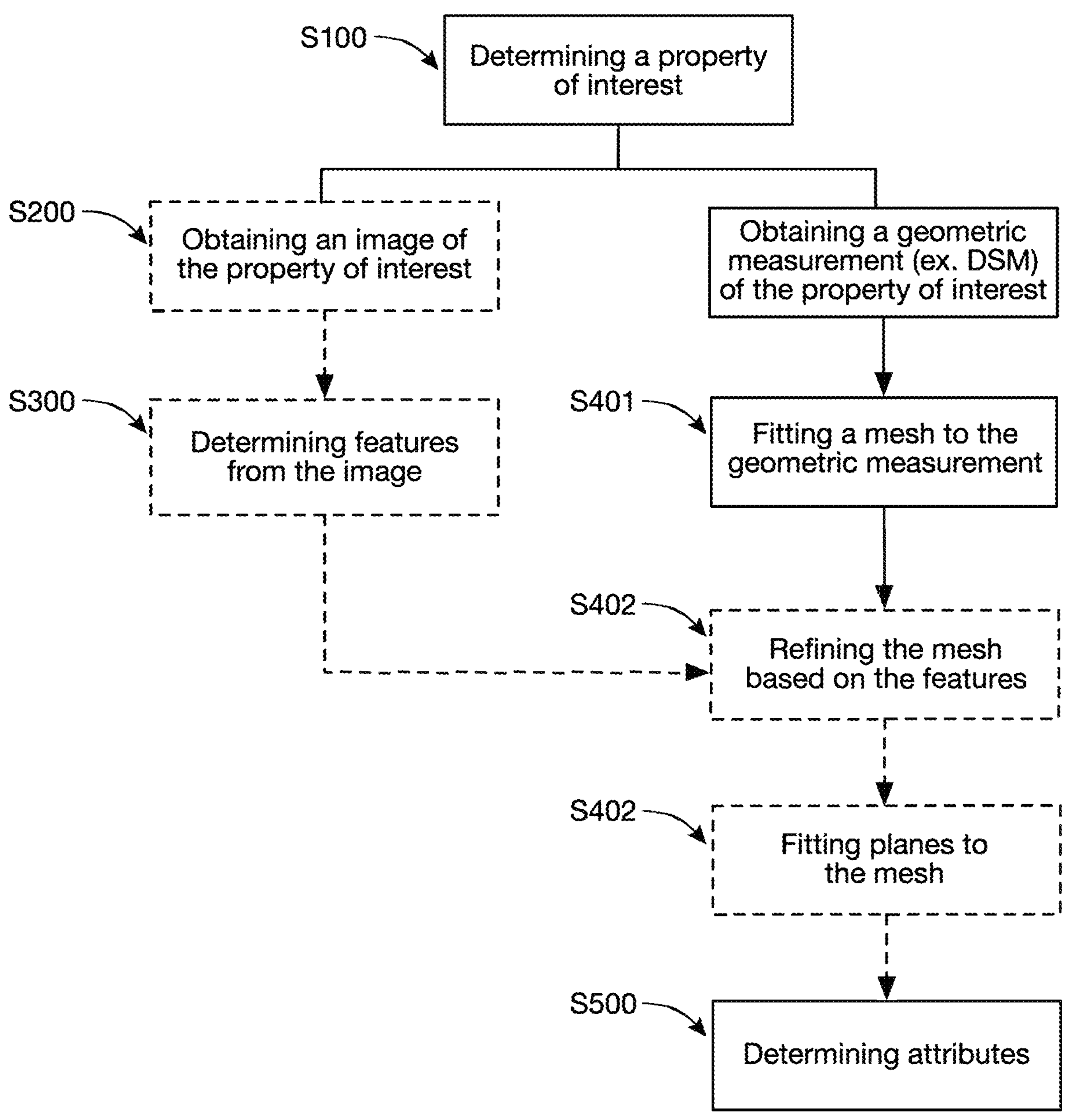
FIG. 2 is a schematic representation of a first example of the method (e.g., an example of a mesh fitting variant of the method).

In a first variant (e.g., mesh fitting variant), the method can include: for a property of interest, obtaining a DSM (e.g., S200), fitting a mesh to the DSM (e.g., S400), optionally determining roof features (e.g., vertices, edges, etc.) from a 2D image registered with the DSM (e.g., S300), and optionally refining the mesh using roof features and/or other constraints (e.g., planarity constraints) (e.g., S400). An example is shown in FIG. 2. In examples, a wireframe mesh is fit to the DSM, and refined by fitting progressively smaller planes to the DSM (e.g., while being constrained by the roof features).

Figure 3:
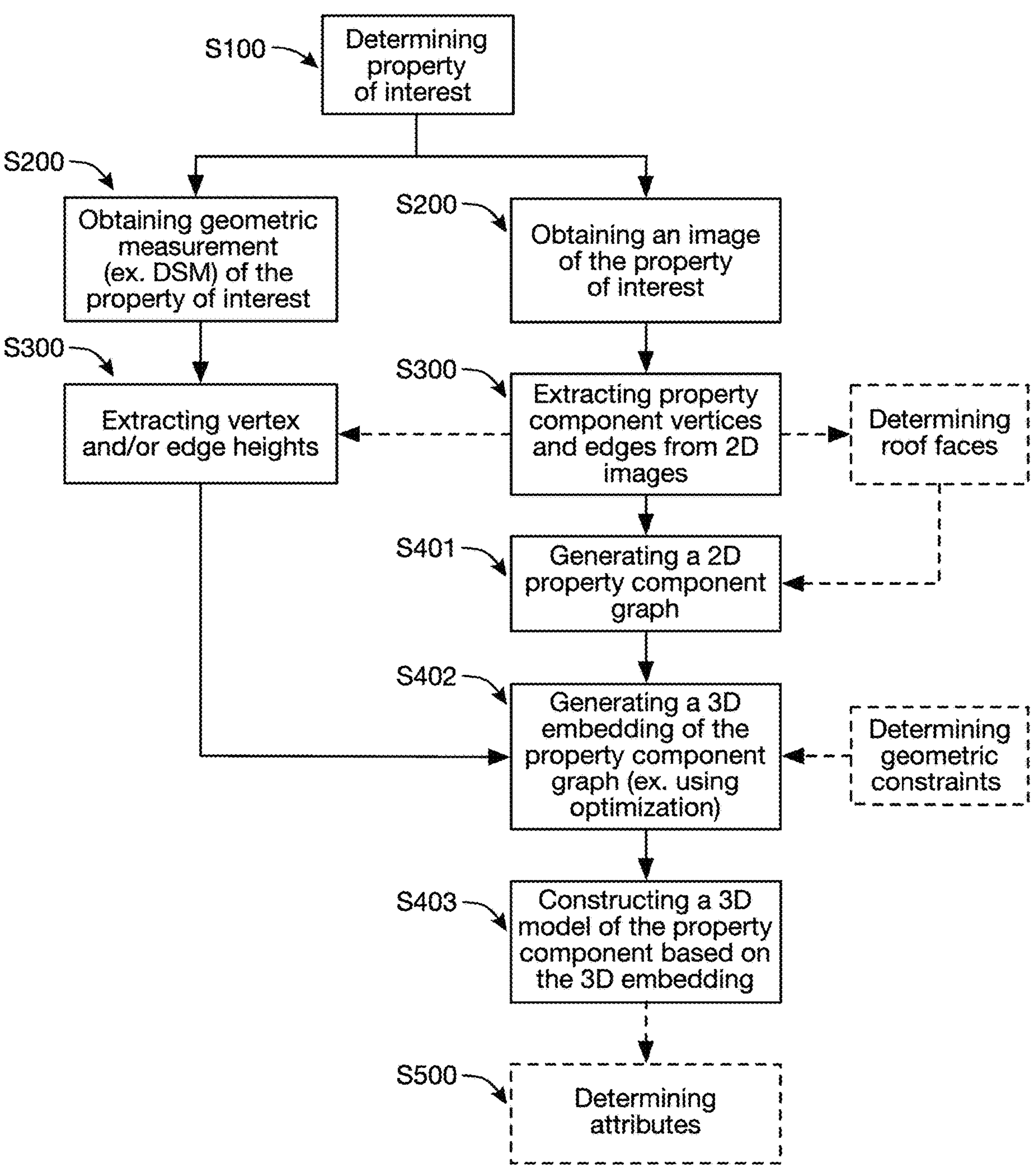
FIG. 3 is a schematic representation of a second example of the method (e.g., an example of a graph-based reconstruction variant of the method).

In a second variant (e.g., graph-based reconstruction variant), the method can include: for a property of interest, obtaining a 2D image (e.g., S200), extracting a set of roof features (e.g., vertices, edges, etc.) from the 2D image (e.g., S300), generating a graph based on the roof feature set, optimizing the graph, and reconstructing a 3D model of the roof based on the graph (e.g., S400). An example is shown in FIG. 3. In examples, features can be extracted using a model, wherein the model is trained by: identifying structural features within a sparse geometric representation (e.g., sparse 3D model, such as a DSM or point cloud, etc.) of a training property, determining the corresponding features (e.g., pixels) in the 2D imagery corresponding to the sparse 3D model, and training the model to extract the corresponding features from 2D imagery. The graph can be optimized using heights (e.g., for vertices, peaks, valleys, apexes, nadirs, etc.) determined from a sparse 3D model (e.g., DSM, point cloud, etc.) of the property that is registered with the 2D imagery. The graph can be optimized using planarity constraints, slope constraints, face graph validity (e.g., wherein the face graph is generated based on the roof feature graph), and/or any other suitable set of constraints.

Figure 4:
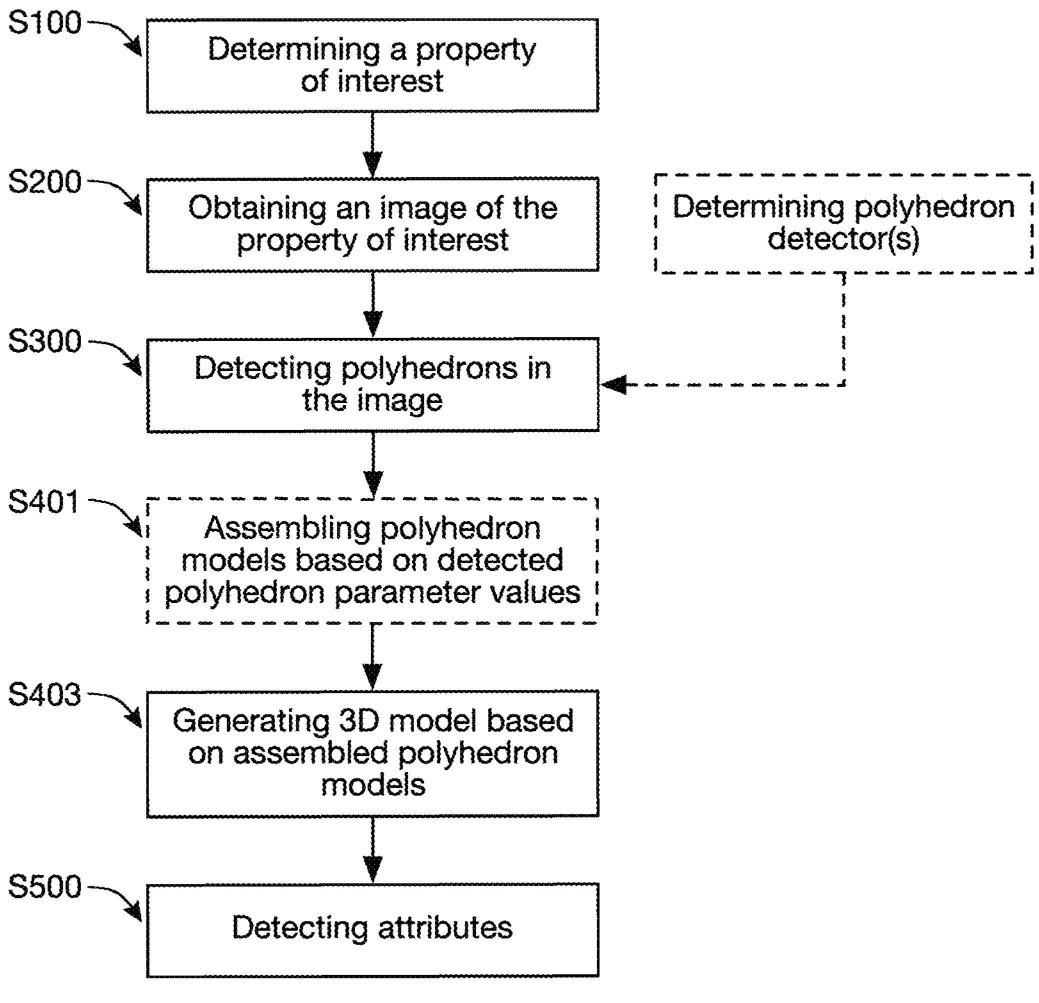
FIG. 4 is a schematic representation of a third example of the method (e.g., an example of a polyhedron variant of the method).

In a third variant (e.g., polyhedron variant), the method can include: for a property of interest, obtaining 2D images depicting the property (e.g., the roof) (e.g., S200); detecting polyhedron bounding boxes in the 2D image (e.g., in the roof segment) using one or more object detectors (e.g., S300), wherein the detected polyhedron bounding boxes can be associated with values for: a polyhedron type (e.g., number of faces, face shape, face slope, face angles, etc.), a position (e.g., geographic position), an orientation (e.g., rotation relative to cardinal directions, relative to the image frame, relative to other detected polyhedron bounding boxes), a size (e.g., scaling factor), and/or other shape parameters; assembling 3D models of the detected polyhedrons based on the respective shape parameter values; and merging the assembled 3D models into a 3D roof model (e.g., S400). An example is shown in FIG. 4. The detected polyhedrons can optionally be selected from a set of candidate polyhedrons (e.g., a subspace of polyhedrons). In examples, the object detector can be trained by: fitting polyhedrons to a sparse 3D model (e.g., DSM, point cloud) of the roof, optionally determining the polyhedron parameter values based on the fit polyhedrons (such as the polyhedron type, position, orientation, and scale), optionally determining the polyhedron bounding boxes in a 2D image registered with the 3D model (e.g., by projecting the fitted polyhedrons into the 2D image), and training the object detector to detect the polyhedrons (and/or the polyhedron parameter values) from a 2D image corresponding to the sparse 3D model of the roof.

3. TECHNICAL ADVANTAGES

Variants of the technology can confer one or more advantages over conventional technologies.

First, variants of the technology can determine a 3D model of a roof using a single image, instead of using multiple images depicting different views of the roof. These variants can use information from sparse geometric representations of the roof (e.g., DSM, point clouds), and/or predict the 3D model based only on an appearance-based imagery. By using less imagery, the technology can reduce the costs of imagery retrieval and speed up 3D model generation (e.g., such that the model can be generated in real- or near-real time). Furthermore, because the technology can be based on 2D imagery, it can also allow for better geographic coverage for roof analytics by using readily available measurements that can be more regularly updated.

Second, variants of the technology can use a trained object detector to detect (constituent) polyhedrons in an image of a roof, and generate a 3D model of the roof using the detected polyhedrons. In an example, the trained object detector can detect polyhedrons using a subspace of all polyhedrons (e.g., a learned subspace, a predetermined subspace, etc.). By using a constrained subspace of candidate shapes, the technology can increase computational speed of 3D roof model generation. In another example, by detecting 3D elements (e.g., instead of detecting 2D elements or in addition to detecting 2D elements), variants of the technology can increase the stability of roof model generation. In a specific example, this increased stability can be due to the increased regularization effects of 3D points relative to 2D points. In another example, the trained object detector can: extract an embedding (e.g., machine learning features, feature vector, etc.) of the property (e.g., of the roof) from the image and determine polyhedron parameter values based on the embedding (e.g., polyhedron type, pose, scale, etc.), wherein the 3D roof model can be reconstructed based on the determined polyhedron parameter values. By determining the 3D roof model based on the image embedding, the method can: preserve influential image information in the learned embedding (e.g., preserve nonsemantic image information influential for polyhedron determination), thereby increasing the accuracy of the resultant 3D model; increase the computational speed over conventional methods by reducing the number of polyhedron permutations that need to be considered; and/or confer other benefits over conventional methods.

Third, variants of the technology can generate 3D roof models with increased accuracy. For example, the method can include: generating a graph based on roof features extracted from 2D imagery, optimizing the graph using heights for the property (e.g., for vertices, peaks, valleys, apexes, nadirs, etc.) extracted from a 3D geometric representation (e.g., DSM, point cloud, etc.) of the property, and reconstructing a 3D roof model based on the optimized graph. Using heights extracted from the 3D geometric representation of the roof can increase accuracy of the 3D roof model. In a specific example, using a graph generated from both 2D imagery and heights extracted from a sparse 3D geometric representation can result in a 3D roof model that has increased accuracy relative to a 3D roof model generated from (only) the 2D images or (only) the 3D geometric representation.

However, further advantages can be provided by the system and method disclosed herein.

4. SYSTEM

Figure 12:
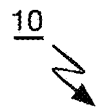
FIG. 12 is a schematic representation of a variant of the system.
Figure 12:
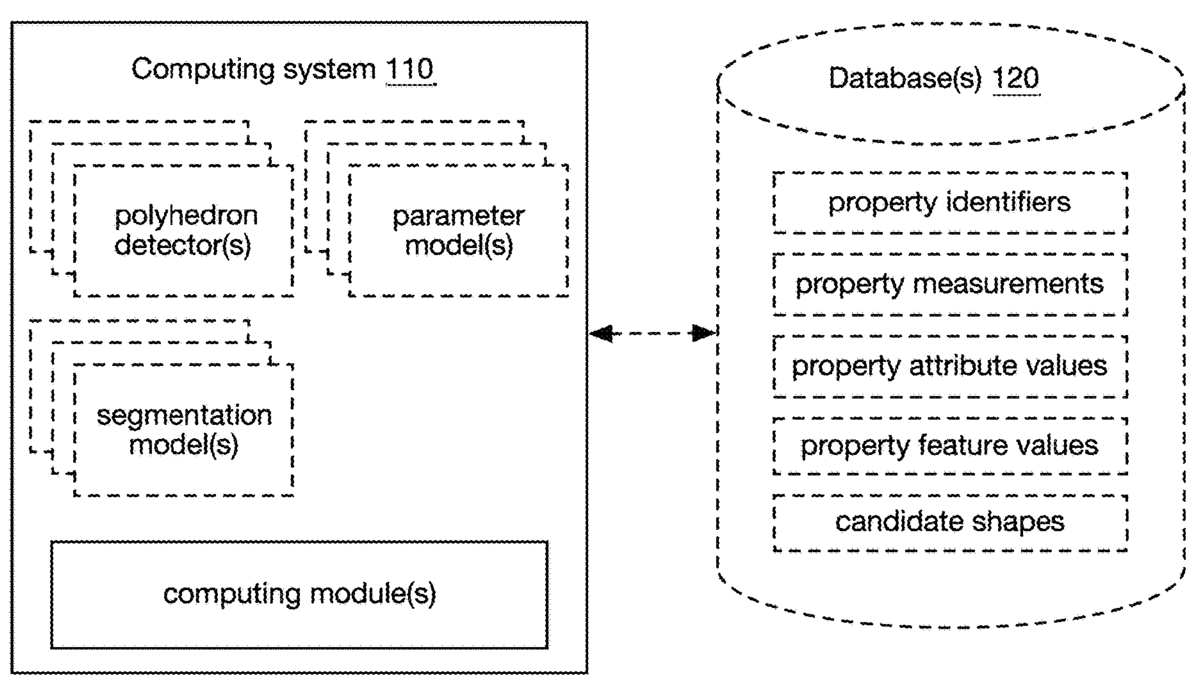

The method is preferably performed using a system 10 (example shown in FIG. 12), including: one or more computing systems 110, optionally one or more databases 120, and/or any other suitable components. However, the method can additionally and/or alternatively be performed using any other suitable system. The system 10 can function to facilitate execution of the method. However, the system 10 can provide any other suitable function.

4.1. Properties.

The system 10 and/or method can be used with one or more properties. The properties can function as test properties (e.g., properties of interest), training properties (e.g., used to train the model(s)), and/or be otherwise used.

Each property can be or include: land (e.g., a parcel, geographic region, etc.), a property component or set or segment thereof, and/or otherwise defined. For example, the property can include both the underlying land and improvements (e.g., built structures, fixtures, etc.) affixed to the land, only include the underlying land, or only include a subset of the improvements (e.g., only the primary building). Property components can include: built structures (e.g., primary structure, accessory structure, deck, pool, tennis court, etc.); subcomponents of the built structures (e.g., roof, siding, framing, flooring, living space, bedrooms, bathrooms, garages, parking lots, foundation, HVAC systems, solar panels, slides, diving board, etc.); permanent improvements (e.g., pavement, statutes, fences, etc.); temporary improvements or objects (e.g., trampoline); vegetation (e.g., tree, hedges, flammable vegetation, lawn, etc.); land subregions (e.g., driveway, sidewalk, lawn, backyard, front yard, wildland, etc.); debris; and/or any other suitable component. The property and/or components thereof are preferably physical, but can alternatively be virtual.

Each property can be identified by one or more property identifiers. A property identifier (property ID) can include: geographic coordinates, an address, a parcel identifier, a location identifier (e.g., Google Plus Codes™, Geohashes™, Place Key™, etc.), a block/lot identifier, a planning application identifier, a municipal identifier (e.g., determined based on the ZIP, ZIP+4, city, state, etc.), and/or any other identifier. The property identifier can be used to retrieve property information, such as parcel information (e.g., parcel boundary, parcel location, parcel area, parcel shape, parcel geometry, etc.), property measurements, property descriptions, and/or other property data. The property identifier can additionally or alternatively be used to identify a property component, such as a primary building or secondary building, and/or be otherwise used.

4.2. Property Information.

Each property can be associated with property information. The property information can be extracted from other property information, retrieved from a third-party, received from a user, and/or be otherwise obtained. The property information can be static (e.g., remain constant over a threshold period of time) or variable (e.g., vary over time). The property information can be associated with: a time (e.g., a generation time, a valid duration, etc.), a source (e.g., the information source), an accuracy or error, and/or any other suitable metadata. The property information is preferably specific to the property, but can additionally or alternatively be from other properties (e.g., neighboring properties, other properties sharing one or more attributes with the property). Examples of property information can include: measurements, descriptions, attributes, auxiliary data, and/or any other suitable information about the property.

Property measurements preferably measure an aspect about the property, such as a visual appearance, geometry, and/or other aspect. Property measurements preferably depict the roof of the property of interest, but can additionally or alternatively depict the sides and/or any other suitable portion of the property of interest. In variants, the property measurements can depict a property (e.g., the property of interest), but can additionally or alternatively depict the surrounding geographic region, adjacent properties, and/or other components. The measurement can be: 2D, 3D, and/or have any other set of dimensions. Examples of measurements can include: images, geometric representations, virtual models (e.g., geometric models, mesh models), audio, video, radar measurements, ultrasound measurements, and/or any other suitable measurement. Examples of geometric representations (e.g., 3D geometric representations) can include or be determined based on (e.g., extracted from): surface models (e.g., digital surface models (DSM), digital elevation models (DEM), digital terrain models (DTM), etc.), point clouds (e.g., generated from LIDAR, RADAR, stereoscopic imagery, etc.), depth maps, depth images, Neural Radiance Fields (NERFs), Gaussian Splatting representations, any other model-based representations, and/or any other geometric representation. The geometric representation can be a sparse geometric representation, which can only include values (e.g., x, y, and/or z values) for a subset of points, define a discontinuous set of values, and/or be otherwise defined; an inaccurate geometric representation (e.g., include inaccurate absolute and/or relative voxel values); and/or be any other suitable geometric representation. Examples of images that can be used include: RGB images, hyperspectral images, multispectral images, black and white images, grayscale images, panchromatic images, IR images, NIR images, UV images, thermal images, and/or images sampled using any other set of wavelengths; images with depth values associated with one or more pixels (e.g., DSM, DEM, etc.); and/or any other suitable images. A measurement can optionally be registered to another measurement. For example, a geometric representation (e.g., 3D geometric representation) can include a digital surface map registered to a 2D measurement (e.g. a 2D image).

The measurements can include: remote measurements (e.g., image taken of a remote scene, geospatial imagery, aerial imagery, satellite imagery, balloon imagery, drone imagery, etc.), local or on-site measurements (e.g., sampled by a user, streetside measurements, etc.), and/or sampled at any other proximity to the property. The remote measurements can be measurements sampled more than a threshold distance away from the property, such as more than 100 ft, 500 ft, 1,000 ft, any range therein, and/or sampled any other distance away from the property. The measurements can be: top-down measurements (e.g., nadir measurements, panoptic measurements, etc.), side measurements (e.g., elevation views, street measurements, etc.), angled and/or oblique measurements (e.g., at an angle to vertical, orthographic measurements, isometric views, etc.), and/or sampled from any other pose or angle relative to the property. In specific examples, the measurements can include a top-down image, an orthographic image (e.g., from the top, from the side, etc.), an oblique image (e.g., from the top, from the side, etc.), and/or an image taken from any other angle. In a specific example, the measurements can include an orthoimage and/or a true orthoimage (e.g., an orthorectified image corrected using a surface model). The measurements can depict the property exterior, the property interior, and/or any other view of the property.

The measurements can be a full-frame measurement, a segment of the measurement (e.g., the segment depicting the property, such as that depicting the property's parcel; the segment depicting a geographic region a predetermined distance away from the property; etc.), a merged measurement (e.g., a mosaic of multiple measurements), orthorectified, and/or otherwise processed.

The measurements can be received as part of a user request, retrieved from a database 120, determined using other data (e.g., segmented from an image, generated from a set of images, etc.), synthetically determined, and/or otherwise determined.

The property information can include property descriptions. The property description can be: a written description (e.g., a text description), an audio description, and/or in any other suitable format. The property description is preferably verbal but can alternatively be nonverbal. The property description can be text-based, image-based, 3D-model based, and/or be otherwise represented. Examples of property descriptions can include: listing descriptions (e.g., from a realtor, listing agent, etc.), property disclosures, inspection reports, permit data, appraisal reports, and/or any other description of a property.

The property information can include auxiliary data. Examples of auxiliary data can include property descriptions, permit data, insurance loss data, inspection data, appraisal data, broker price opinion data, property valuations, property attribute and/or component data (e.g., values), and/or any other suitable data.

Measurements and/or any other property information can optionally be associated with values for one or more contextual parameters. Contextual parameters can include: a perspective (e.g., front elevation, rear elevation, side elevation, top planar view, isometric view, an imaging angle, etc.), a provider, an imaging modality, a real estate listing service, time information (e.g., a season, a time of day, a timestamp, a date, etc.), location information (e.g., latitude, longitude, etc.), sun pose (e.g., angle and/or position relative to a frame of reference), description, property attributes, and/or any other suitable parameter.

However, the property information can include any other suitable information about the property.

One or more property features (e.g., values thereof) can be extracted from the property information (and/or a set thereof). A feature can represent aspects of the information itself (e.g., aspects of the measurement). Features can be independent (e.g., do not carry information about and/or are not dependent on the values of other features) or dependent (e.g., determined based on another feature, dependent upon another feature, etc.). Examples of features that can be determined include: geometric features (e.g., aspects of a geometric measurement), appearance-based features (e.g., aspects of an image or appearance measurement), interaction-based features (e.g., how geometries interact with each other, how attributes interact with each other, etc.), and/or other features. Examples of features that can be extracted can include: color components, length, area, circularity, gradient magnitude, gradient direction, points, edges, measurement unit intensity values, convexity gain (e.g., whether the total convexity of two combined geometries is higher than the convexities of the geometries alone), roof features, other property component features, and/or other features.

Features (e.g., values thereof) can be determined using: image processing, point cloud processing, machine learning techniques (ex. extracted using an encoder, extracted by a neural network or an intermediate layer thereof, etc.), SIFT, using a Gaussian, edge detection, corner detection, blob detection, ridge detection, edge direction, changing intensity, autocorrelation, thresholding, blob extraction, template matching, Hough transform, computer vision models, support vector machines, boosted decision trees, any other model, and/or any other suitable set of methodologies.

4.3. Property Attributes.

Each property can be associated with a set of property attributes, which can function to represent one or more aspects of a given property. Attributes can be independent (e.g., do not carry information about and/or are not dependent on the values of other attributes) or dependent (e.g., determined based on another attribute, dependent upon another attribute, etc.). The property attributes can be semantic, quantitative, qualitative, and/or otherwise describe the property. Each property can be associated with its own set of property attributes, and/or share property attributes with other properties. As used herein, property attributes can refer to the attribute parameter (e.g., the variable) and/or the attribute value (e.g., value bound to the variable for the property).

Property attributes can include: property components, features (e.g., feature vector, mesh, mask, point cloud, pixels, voxels, any other parameter extracted from a measurement), any parameter associated with a property component (e.g., property component characteristics), semantic features (e.g., whether a semantic concept appears within the property information), and/or higher-level summary data extracted from property components and/or features. Property attributes can be determined based on property information for the property itself, neighboring properties, and/or any other set of properties. Property attributes can be determined based on: measurements, features, other property information, and/or any other suitable data. Property attributes can be automatically determined (e.g., by a model), manually determined (e.g., by an inspector, by a real estate appraiser, etc.), and/or otherwise determined.

Property attributes can include: structural attributes, record attributes, condition attributes, semantic attributes, subjective attributes, neighborhood attributes, market attributes, and/or any other suitable set of attributes. Other property attributes can include: built structure values (e.g., roof slope, roof rating, roof material, roof footprint, covering material, etc.), auxiliary structures (e.g., a pool, a tennis court, a statue, ADU, etc.), risk asset scores (e.g., asset score indicating risk of flooding, hail, wildfire, wind, house fire, etc.), neighboring property values (e.g., distance of neighbor, structure density, structure count, etc.), and/or any other suitable attributes.

Example property attributes can include: structural attributes (e.g., for a primary structure, accessory structure, neighboring structure, etc.), record attributes (e.g., number of bed/bath, construction year, square footage, legal class, legal subclass, geographic location, etc.), condition attributes (e.g., yard condition, roof condition, pool condition, tennis court condition, paved surface condition, etc.), semantic attributes (e.g., semantic descriptors), location (e.g., parcel centroid, structure centroid, roof centroid, etc.), property type (e.g., single family, lease, vacant land, multi-family, duplex, etc.), property component parameters (e.g., area, enclosure, presence, structure type, count, material, construction type, area condition, spacing, relative and/or global location, distance to another component or other reference point, density, geometric parameters, condition, complexity, etc.; for pools, porches, decks, patios, fencing, etc.), storage (e.g., presence of a garage, carport, etc.), permanent or semi-permanent improvements (e.g., solar panel presence, count, type, arrangement, and/or other solar panel parameters; HVAC presence, count, footprint, type, location, and/or other parameters; etc.), temporary improvement parameters (e.g., presence, area, location, etc. of trampolines, playsets, etc.), pavement parameters (e.g., paved area, percent illuminated, paved surface condition, etc.), foundation elevation, terrain parameters (e.g., parcel slope, surrounding terrain information, etc.), legal class (e.g., residential, mixed-use, commercial), legal subclass (e.g., single-family vs. multi-family, apartment vs. condominium), geographic location (e.g., neighborhood, zip, etc.), population class (e.g., suburban, urban, rural, etc.), school district, orientation (e.g., side of street, cardinal direction, etc.), subjective attributes (e.g., curb appeal, viewshed, etc.), built structure values (e.g., roof slope, roof rating, roof material, roof footprint, covering material, number of roof facets, etc.), auxiliary structures (e.g., a pool, a tennis court, a statue, ADU, etc.), risk scores (e.g., score indicating risk of flooding, hail, fire, wind, wildfire, etc.), neighboring property values (e.g., distance to neighbor, structure density, structure count, etc.), context (e.g., hazard context, geographic context, vegetation context, weather context, terrain context, etc.), historical construction information, historical transaction information (e.g., list price, sale price, spread, transaction frequency, transaction trends, etc.), semantic information, and/or any other attribute that remains substantially static after built structure construction.

In variants, the set of attributes that are used (e.g., by the model(s)) can be selected from a superset of candidate attributes. This can function to: reduce computational time and/or load (e.g., by reducing the number of attributes that need to be extracted and/or processed), increase score prediction accuracy (e.g., by reducing or eliminating confounding attributes), and/or be otherwise used. The set of attributes can be selected: manually, automatically, randomly, recursively, using an attribute selection model, using lift analysis (e.g., based on an attribute's lift), using any explainability and/or interpretability method, based on an attribute's correlation with a given metric or training label, using predictor variable analysis, through predicted outcome validation, during model training (e.g., attributes with weights above a threshold value are selected), using a deep learning model, based on a zone classification, and/or via any other selection method or combination of methods.

Attribute values can be discrete, continuous, binary, multiclass, and/or otherwise structured. The attribute values can be associated with time data (e.g., from the underlying measurement timestamp, value determination timestamp, etc.), a hazard event, an uncertainty parameter, and/or any other suitable metadata.

Attribute values can optionally be associated with an uncertainty parameter. Uncertainty parameters can include variance values, a confidence score, and/or any other uncertainty metric. In a first illustrative example, the attribute value model classifies the roof material for a structure as: shingle with 90% confidence, tile with 7% confidence, metal with 2% confidence, and other with 1% confidence. In a second illustrative example, 10% of the roof is obscured (e.g., by a tree), which can result in a 90% confidence interval for the roof geometry attribute value. In a third illustrative example, the vegetation coverage attribute value is 70%±10%. In a fourth illustrative example, attributes can be characterized with a quantile distribution of attribute values (e.g., wherein the uncertainty parameter for each attribute value is determined based on the quantile that the value falls within or a probability of the quantile distribution).

The attributes can be determined from property information (e.g., property measurements, property descriptions, etc.), a database 120 or a third party source (e.g., third-party database, MLS™ database, city permitting database, historical weather and/or hazard database, tax assessor database, etc.), be predetermined, be calculated (e.g., from an extracted value and a scaling factor, etc.), and/or be otherwise determined. In a first example, the attributes can be determined by extracting features from property measurements, wherein the attribute values can be determined based on the extracted feature values. In a second example, a trained attribute model can predict the attribute value directly from property information (e.g., based on property imagery, descriptions, etc.). In a third example, the attributes can be determined by extracting features from a property description (e.g., using a sentiment extractor, keyword extractor, etc.). However, the attributes can be otherwise determined. In examples, property attributes and/or values thereof can defined and/or determined as disclosed in U.S. application Ser. No. 18/092,689 filed 3 Jan. 2023, U.S. application Ser. No. 17/526,769 filed 15 Nov. 2021, U.S. application Ser. No. 17/546,620 filed 9 Dec. 2021, U.S. application Ser. No. 17/529,836 filed 18 Nov. 2021, U.S. application Ser. No. 17/749,385 filed 20 May 2022, U.S. application Ser. No. 18/121,114 filed 14 Mar. 2023, U.S. application Ser. No. 18/528,255 filed 4 Dec. 2023, U.S. application Ser. No. 17/981,903 filed 7 Nov. 2022, U.S. application Ser. No. 18/370,758 filed 20 Sep. 2023, U.S. application Ser. No. 17/841,981 filed 16 Jun. 2022, U.S. application Ser. No. 18/141,033 filed 28 Apr. 2023, U.S. application Ser. No. 18/098,841 filed 19 Jan. 2023, and/or U.S. application Ser. No. 18/100,736 filed 24 Jan. 2023, each of which is incorporated in its entirety by this reference (e.g., wherein features and/or feature values disclosed in the references can correspond to attributes and/or attribute values).

Property attributes and/or attribute values are preferably determined contemporaneously with method execution, asynchronously from method execution, in real time or near real time (NRT) with respect to the method, and/or with any other suitable frequency and/or timing. Attributes and values can be stored by the processing system performing the determination of property attributes, and/or by any other suitable system. Preferably, storage can be temporary, based on time (e.g., 1 day, 1 month, etc.), based on use (e.g., after one use of the property attribute values by the asset prediction model), based on time and use (e.g., after one week without use of property attribute values), and/or based on any other considerations. Alternatively, property asset data is permanently stored.

However, any other suitable property attribute and/or value thereof can be determined.

4.4. Models.

The system 10 can be used with one or more models. The models can include classical or traditional approaches, machine learning approaches, and/or be otherwise configured. The models can be or include: neural networks (e.g., CNN, DNN, CV model, CAN, LSTM, RNN, FNN, encoders, decoders, deep learning models, transformers, etc.), language processing techniques (e.g., LSA), ensemble methods, an equation (e.g., weighted equations), regression (e.g., leverage regression), a curve, foundation models (e.g., GPT-3, BERT, DALL-E 2, SAM, etc.), classification (e.g., binary classifiers, multiclass classifiers, semantic segmentation models, instance-based segmentation models, etc.), segmentation algorithms (e.g., neural networks, such as CNN based algorithms, thresholding algorithms, clustering algorithms, etc.), optimization methods (e.g., Bayesian optimization, constrained optimization, greedy algorithm, etc.), rules, heuristics (e.g., inferring the number of stories of a property based on the height of a property), instance-based methods (e.g., nearest neighbor), association rules, lookups, regularization methods (e.g., ridge regression), decision trees, Bayesian methods (e.g., Naïve Bayes, Markov, etc.), kernel methods, statistical methods (e.g., probability), deterministics, support vectors (e.g., SVM, SVC, etc.), genetic programs, isolation forests, robust random cut forest, clustering, dimensionality reduction (e.g., PCA, t-SNE, LDA, etc.), selection and/or retrieval (e.g., from a database 120 and/or library), comparison models (e.g., vector comparison, image comparison, matching, distance metrics, thresholds, etc.), object detectors (e.g., CNN based algorithms, such as Region-CNN, fast RCNN, faster R-CNN, YOLO, SSD—Single Shot MultiBox Detector, R-FCN, etc.), feed forward networks, transformer networks, generative algorithms (e.g., diffusion models, GANs, etc.), and/or other neural network algorithms, key point extraction, SIFT, any computer vision and/or machine learning method (e.g., CV/ML extraction methods), and/or any other suitable model or methodology. The models can include (e.g., be constructed using) a set of input layers, output layers, and hidden layers (e.g., connected in series, such as in a feed forward network; connected with a feedback loop between the output and the input, such as in a recurrent neural network; etc.; wherein the layer weights can be learned through training); a set of fully or partially connected convolution layers (e.g., in a CNN); a set of self-attention layers; and/or have any other suitable architecture.

Models can be trained, learned, fit, predetermined, and/or can be otherwise determined. The models can be learned or trained (e.g. pre-trained) using: self-supervised learning, semi-supervised learning (e.g., positive-unlabeled learning), supervised learning, unsupervised learning, reinforcement learning, transfer learning, Bayesian optimization, positive-unlabeled learning, using backpropagation methods (e.g., by propagating a loss calculated based on a comparison between the predicted and actual training target back to the model; by updating the architecture and/or weights of the model based on the loss; etc.), fitting, interpolation and/or approximation (e.g., using gaussian processes), and/or otherwise learned. Models can be learned or trained on: labeled data (e.g., data labeled with the target label), unlabeled data, positive training sets (e.g., a set of data with true positive labels), negative training sets (e.g., a set of data with true negative labels), and/or any other suitable set of data.

Models can optionally be validated, verified, reinforced, calibrated, or otherwise updated based on newly received, up-to-date measurements; past measurements recorded during the operating session; historic measurements recorded during past operating sessions; or be updated based on any other suitable data.

Models can optionally be run or updated: once; at a predetermined frequency; every time the method is performed; every time an unanticipated measurement value is received; or at any other suitable frequency. Any model can optionally be run or updated: in response to determination of an actual result differing from an expected result; or at any other suitable frequency. Any model can optionally be run or updated concurrently with one or more other models, serially, at varying frequencies, or at any other suitable time.

The method can optionally include determining interpretability and/or explainability of a trained model, wherein the identified attributes (and/or values thereof) can be provided to a user, used to identify errors in the data, used to identify ways of improving the model, and/or otherwise used. Interpretability and/or explainability methods can include: local interpretable model-agnostic explanations (LIME), Shapley Additive explanations (SHAP), Ancors, DeepLift, Layer-Wise Relevance Propagation, contrastive explanations method (CEM), counterfactual explanation, Protodash, Permutation importance (PIMP), L2X, partial dependence plots (PDPs), individual conditional expectation (ICE) plots, accumulated local effect (ALE) plots, Local Interpretable Visual Explanations (LIVE), breakDown, ProfWeight, Supersparse Linear Integer Models (SLIM), generalized additive models with pairwise interactions (GA2Ms), Boolean Rule Column Generation, Generalized Linear Rule Models, Teaching Explanations for Decisions (TED), and/or any other suitable method and/or approach.

All or a portion of the models can be debiased (e.g., to protect disadvantaged demographic segments against social bias, to ensure fair allocation of resources, etc.), such as by adjusting the training data, adjusting the model itself, adjusting the training methods, and/or otherwise debiased. Methods used to debias the training data and/or model can include: disparate impact testing, data pre-processing techniques (e.g., suppression, massaging the dataset, apply different weights to instances of the dataset), adversarial debiasing, Reject Option based Classification (ROC), Discrimination-Aware Ensemble (DAE), temporal modelling, continuous measurement, converging to an optimal fair allocation, feedback loops, strategic manipulation, regulating conditional probability distribution of disadvantaged sensitive attribute values, decreasing the probability of the favored sensitive attribute values, training a different model for every sensitive attribute value, and/or any other suitable method and/or approach.

The system 10 and/or method can include and/or be used with one or more: parameter models (e.g., roof feature models), property component segmentation models, object detectors, attribute models, feature extractors, and/or any other suitable models.

The one or more parameter models can function to determine property component parameter values based on property information. Inputs to the parameter model can include 2D measurements (e.g., orthoimage, true orthoimage, other 2D images, etc.), 3D measurements (e.g., a 3D geometric representation), contextual parameter values, candidate shapes, property component parameter values (e.g., determined using another parameter model), a combination thereof, and/or any other property information. In a specific example, inputs can include only 2D measurements (e.g., multiple 2D measurements; only a single 2D measurement, without using multiple 2D measurements; etc.). In a second specific example, inputs can include only 3D measurements (e.g., only a 3D geometric representation). In a third specific example, inputs can include a combination of one or more 2D measurements and one or more 3D measurements (e.g., registered to the 2D measurements). Outputs from the parameter model can include property component features (e.g., edges, corners, apexes, etc.; constituent geometric shapes; etc.), property component feature parameter values (e.g., values for position, shape, pose, orientation, size, etc.), other property component parameter values, uncertainty parameters (e.g., a confidence score for each property component feature and/or parameter thereof), and/or any other suitable outputs.

In a first example, the parameter model can output property component features (e.g., roof features) and (x,y) coordinates for all or a subset of the property component features (e.g., based on one or more 2D measurements). In a second example, the parameter model can output property component features and (x,y,z) coordinates for all or a subset of the property component features (e.g., based on one or more 2D measurements, based on a combination of 2D measurements and 3D measurements, etc.). In a third example, the parameter model can output geometric shapes (e.g., polyhedrons) and/or shape parameter values (e.g., based on one or more 2D measurements, based on a combination of 2D measurements and 3D measurements, etc.). In a specific example, the parameter model can output the geometric shapes and/or shape parameter values based on a set of candidate shapes (e.g., candidate polyhedrons).

In specific examples, the parameter model can include: an auto regressor, a model using classical methods (e.g., HOG, edge detectors, feature detectors, key point detectors, etc.), a neural network (e.g., CNN), an object detector (e.g., YOLO, centernet, etc.), a foundation model, a segment anything model (SAM), and/or any other suitable method. In a specific example, the parameter model can be or include one or more object detectors (e.g., polyhedron detectors), which can output constituent geometric shapes and/or associated parameter values.

However, the one or more parameter models can be otherwise configured.

However, the system 10 can include and/or be used with any other suitable models.

The system 10 can include one or more computing systems 110, which can function to execute all or portions of the method, execute one or more modules of the system 10, and/or perform any other suitable functionality. The computing system 110 is preferably a remote computing system (e.g., a platform, a server system, etc.), but can additionally and/or alternatively be performed by a distributed computing system, a local computing system (e.g., a user device such as a smartphone, a laptop, a desktop, a tablet, etc.), a centralized computing system, a combination thereof, and/or any be otherwise configured. The computing system no can be used with a user interface or not be used with a user interface. The user interface can be used to: receive one or more inputs (e.g., property identifiers, property requests, attribute values, etc.), display (e.g., present) one or more outputs and/or other parameters (e.g., model outputs, attribute values, feature values, groups of properties, confidence scores, etc.), and/or be otherwise used. The user interface can be: a graphic user interface, a command line interface, an application programming interface (API), and/or any other suitable type of interface. The interface can be an application (e.g., browser application, native application, etc.) on a user device (e.g., laptop, desktop, mobile phone, tablet, etc.), an API, and/or any other suitable interface. The computing system 110 can optionally interface with the one or more databases 120.

In variants, the one or more computing systems 10 can include one or more computing modules, which can function to facilitate execution of method elements. The one or more computing modules can be executed contemporaneously, synchronously, asynchronously, in series, in parallel, and/or be otherwise implemented. In a first example, the computing system 110 can include a first computing module which functions to determine a property in accordance with S100, a second computing module which functions to determine whether the property is part of a group in accordance with S200, and a third computing module which functions to identify other properties within the group in accordance with S300. In a second example, the computing system 110 can include a single computing module which can function to facilitate execution of an instance of the method. However, the one or more computing modules can be otherwise configured.

However, the one or more computing systems no can be otherwise configured.

The system 10 can include one or more databases 120, which can function to store property data such as: property identifiers, property information (e.g., measurements, auxiliary data, etc.), attribute values, feature values, parcels, groups of properties, confidence scores, and/or any other suitable information. The database 120 can be a remote database, a local database, a distributed database, a centralized database, a cloud database, a combination thereof, and/or any be otherwise configured. The database 120 can be a NoSQL database, a relational database (RDS), a hierarchical database, and/or any other suitable database. The database 120 is preferably queryable (e.g., based on a property identifier) to retrieve property data, but can additionally and/or alternatively not be queryable. The database 120 can be and/or interface with a third-party source (e.g., a third-party database, a real estate listing database, tax assessor database, city permitting database, etc.), but can alternatively not interface with a third-party source. The information in the database 120 can be retrieved from, linked to, and/or be otherwise associated with a third-party source. For example, a property identifier for each of a set of properties is stored in the database 120, wherein attribute values are stored in association with the corresponding property identifier for all or a subset of the properties. Attribute values can optionally be edited and/or appended to the database 120 when new property information (e.g., recent imagery or other measurements) is added.

However, the one or more databases 120 can be otherwise configured.

However, the system 10 can include any other suitable components.

5. METHOD

As shown in FIG. 1, the method can include: determining a property of interest S100, determining property information for the property of interest S200, determining property component parameter values based on property information S300, and determining a 3D model based on property component parameter values S400. The method can optionally include determining a set of property attributes S500 (e.g., based on the 3D model). However, the method can additionally and/or alternatively include any other suitable elements.

All or portions of the method can be performed in real time (e.g., responsive to a request), iteratively, concurrently, asynchronously, periodically, and/or at any other suitable time. All or portions of the method can be performed automatically, manually, semi-automatically, and/or otherwise performed. All or portions of the method can be performed by one or more components of the system 10, a third-party system, by a user, and/or by any other suitable system.

One or more instances of the method can be performed for one or more properties of interest, one or more timeframes, one or more attribute sets and/or attribute value sets, one or more providers, one or more third-parties, one or more models, and/or otherwise performed.

All or portions of the method can be performed: in response to receiving a request (e.g., for a property) from an endpoint, before receipt of a request, upon occurrence of a predetermined event, upon receipt of a new measurement, upon determination of a new attribute value, upon determination of a new feature value, once, periodically, repeatedly, randomly, and/or at any other suitable time and/or frequency. In an example, the method can be executed in response to a user request (e.g., via an API) for determining properties that are part of a shared group, given a property (e.g., an address). In another example, various portions of the method can be pre-computed for properties (e.g., attribute values can be precomputed and/or stored in a database 120) prior to a user request for information related to the property of interest.

The method can be performed for a property identified in a request (e.g., for an insurance entity, for a property investor, etc.), for a manually identified property, for a randomly determined property, for all properties within a geographic region (e.g., manually-determined geographic region, all properties depicted in an image, etc.), for all properties within a set of properties (e.g., in a database), and/or for any other suitable property.

5.1. Determining a Property of Interest S100.

Determining a property of interest S100 functions to determine a property to be analyzed. S100 can be performed before S200, after S200 (e.g., measurements can be determined for a set of properties, prior to selecting a property of interest), after S300 (e.g., roof features can be determined for a set of properties, prior to selecting a property of interest), and/or at any other suitable time. The property of interest can be: one property, multiple properties, and/or any other suitable number of properties. The property of interest can be: a real property (e.g., land and built structure), a built structure, a segment of a built structure, and/or any other suitable property. The property of interest is preferably identified by a property identifier (e.g., geocoordinates, a parcel identifier, an address, a lot number, a geofence, geolocation, parcel number, block number, etc.), but can additionally and/or alternatively be identified by any other suitable identifier. The property of interest can be received from a user (e.g., on an interface), as part of a request (e.g., an API request) from an endpoint, retrieved from a database 120 using a property identifier (e.g., an address), and/or otherwise determined. The property of interest can be received as a standalone property, received as part of a set of properties, and/or otherwise determined. The set of properties can be determined from: a list of properties, properties within a geographic region (e.g., properties within a town, properties along a street, etc.), properties currently on the market, properties satisfying a set of conditions, properties depicted within an image, a user-provided list, manually determined, randomly determined, and/or otherwise determined. However, the property of interest can be otherwise determined.

3.2. Determining Property Information for the Property S200.

Determining property information for the property S200 functions to determine a measurement depicting a property of interest and/or other information associated with the property. S200 can be performed after S100, asynchronously with S100, and/or at any other suitable time. Property information can include: a set of measurements, contextual parameter values (e.g., context), property attributes, and/or any other property information.

The set of measurements can include one measurement, multiple measurements, and/or any other suitable number of measurements. The set of measurements preferably includes the most recent measurement of the property of interest (e.g., based on a timestamp of when the measurement was captured), but can additionally and/or alternatively be an older measurement of the property of interest, a measurement sampled during a predetermined time or timeframe (e.g., a user-specific timeframe), and/or a measurement captured at any other suitable time. In examples, each measurement can: depict only the property of interest (e.g., a property-specific measurement, wherein a wide-scale measurement depicting the property can be cropped using the property's parcel data); depict multiple properties that includes the property of interest; not depict the property of interest; and/or depict any other suitable property.

The set of measurements can be retrieved from a database 120 (e.g., using a property identifier such as an address), retrieved from a real estate listing service (e.g., a multiple listing service, Redfin™, etc.), received from an image provider (e.g., a satellite image provider, drone image provider, etc.), received from other third-parties, sampled by a sensing system (e.g., satellite, drone, etc.), generated from other measurements (e.g., a point cloud generated from stereoimagery), retrieved from a public repository, a combination thereof, and/or otherwise determined.

The set of measurements preferably depict the roof of the property of interest, but can additionally or alternatively depict the sides and/or any other suitable portion of the property of interest. In a first example, the set of measurements includes a 2D measurement (e.g., 2D image) depicting the property, such as an RGB image, an orthoimage (e.g., orthophoto), a true orthoimage (e.g., true orthophoto), and/or any other 2D measurement. In a specific example the 2D measurement includes a 2D measurement within a threshold angle of a top-down view of the property. The threshold angle can be between 0°-90° or any range or value therebetween (e.g., 80°, 70°, 60°, 50°, 40°, 30°, 20°, 10°, 5°, 2°, etc.), but can alternatively be greater than 90°. In a specific example, the set of measurements includes only 2D measurements (e.g., no 3D measurements). In another specific example, the set of measurements includes only a single 2D measurement (e.g., no other measurements). The 2D measurement can optionally be registered to a 3D measurement (e.g., DSM). In a second example, the set of measurements includes a 3D measurement (e.g., a 3D geometric representation) depicting the property, such as a DSM, DEM, point cloud, and/or any other 3D measurement. In a third example, the set of measurements includes a combination of one or more 2D measurements and one or more 3D measurements depicting the property.

All or a portion of the set of measurements can optionally be associated with values for contextual parameters (e.g., associated with the measurement context). Contextual parameters can include: a perspective (e.g., front elevation, rear elevation, side elevation, top planar view, isometric view, an imaging angle, etc.), a provider, an imaging modality, a real estate listing service, time information (e.g., a season, a time of day, a timestamp, a date, etc.), location information (e.g., latitude, longitude, etc.), sun pose (e.g., angle and/or position relative to a frame of reference), description, property attributes, and/or any other suitable parameter. In a first example, contextual parameter values can be and/or be extracted from metadata corresponding to a measurement. In a second example, contextual parameter values can be and/or be extracted from property attributes. In a third example, the contextual parameter values can be determined based on other contextual parameter values. In a specific example, the sun pose can be determined based on time information and location information.

However, property information can be otherwise determined.

3.3. Determining Property Component Parameter Values Based on the Property Information S300.

Determining property component parameter values based on property information S300 can function to detect key parameter values that define the property component geometry. The parameters are preferably features (e.g., property component features), but can additionally or alternatively include attributes, geometric parameters (e.g., position, orientation, dimensions, pose, size, scale, rotation, etc.), type, and/or other parameters. In an example, S300 can output property component features and optionally parameter values for the property component features. S300 is preferably performed after S200, using the output of S200 (e.g., 2D images, DSM, contextual parameter values, etc.) as input.

The property component is preferably a roof, but can be any other suitable property component. References to roof herein can be understood to equally apply to other property components.

Property component parameters (e.g., roof parameters) can optionally include property component features (e.g., roof features) and/or parameters for one or more property component features (e.g., roof feature parameters).

In a first variant, property component features can include key points and/or any other geometric feature defining the boundaries and/or other geometry of the property component (e.g., roof). In examples, the property component features can include all or a subset of: vertices (e.g., where two or more edges meet), edges (e.g., boundary edges, ridges, valleys, etc.), corners, apexes, peaks, valleys, nadirs, objects, faces, planes, boundary points, a representation thereof (e.g., a face representation such as a face centroid), and/or any other geometric feature of the property component. In an example, property component parameters can include parameters for one or more property component features. In examples, the property component parameters can include: position (e.g., coordinates relative to a reference frame), shape, pose, orientation, size, connections to other property component features, and/or other information.

In a second variant, property component features can include a set of constituent geometric shapes, wherein the set of constituent geometric shapes cooperatively form the property component geometry. The constituent geometric shapes are preferably 3D shapes, but can alternatively be 2D shapes and/or have any other dimensions. The constituent geometric shapes are preferably polyhedrons (e.g., pentahedrons, prisms, tetrahedrons, etc.), but can additionally or alternatively include other geometric shapes (e.g., spheres, cones, cylinders, etc.). In an example, property component parameters can include shape parameters for a geometric shape, such as: a shape class, shape position (e.g., in pixel coordinates, geographic coordinates, etc.), orientation (e.g., relative to the image, relative to a geographic reference, etc.), size (e.g., scale, dimensions, height, etc.), a set of manipulations (e.g., vertex manipulations, edge manipulations, face splitting, scaling, etc.), number of faces, angle of one or more faces, angle between faces, an identifier thereof, and/or any other suitable object parameters. Each shape parameter can be constrained (e.g., the shape parameter value is set to a predetermined value, set to a predetermined range, constrained relative to other shape parameter, etc.), partially constrained, or unconstrained (e.g., variable). In illustrative examples, shape classes (e.g., polyhedron classes) can include rectangular prism; triangular prism;

pyramid; a polyhedron with a rectangular base, two triangular sides, and two trapezoidal sides; and/or any other class. In a specific example, a shape class can be defined by a set of constraints (e.g., predetermined values) for one or more shape parameters. The set of constraints can include values and/or ranges for: the number of faces; shape class of each face; relative dimensions between edges, faces, and/or other dimensions (e.g., two edges are congruent); orientation; a combination thereof; and/or any other parameter. In an illustrative example, an orientation constraint can include the base of the geometric shape is oriented parallel to a plane of the base of the roof.

Figure 10A:
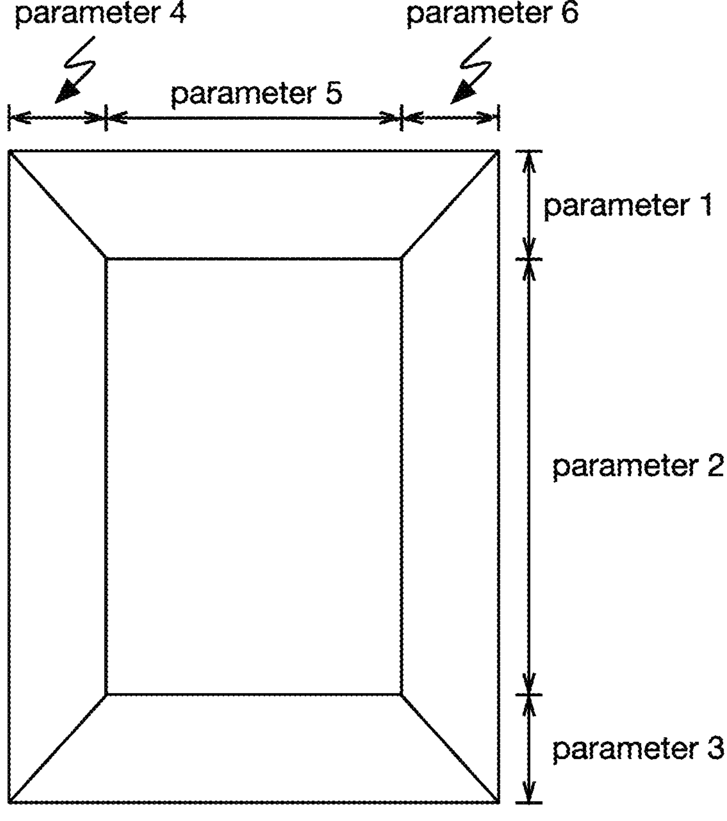
FIGS. 10A-10B depict illustrative examples of a set of candidate shapes (e.g., candidate polyhedrons) projected in a 2D plane.
Figure 10B:
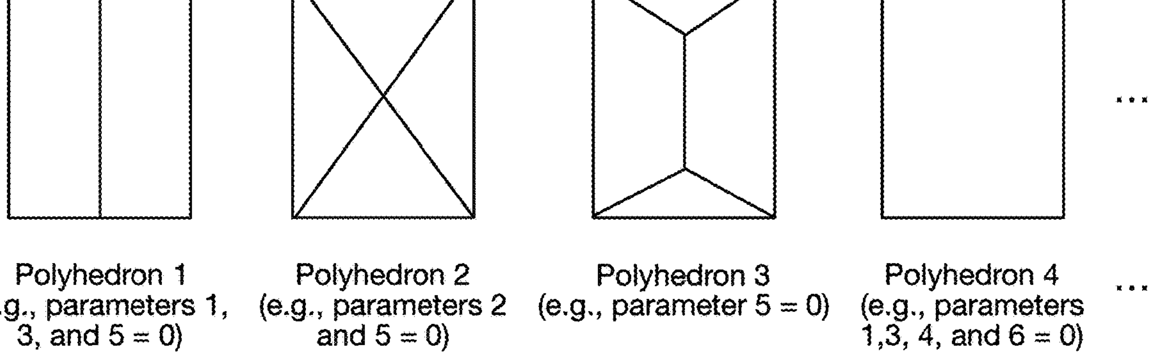

A set of candidate shapes (e.g., candidate polyhedrons) can include a set of shape classes (e.g., polyhedron classes) and/or any other subspace of geometric shapes (e.g., subspace of polyhedrons). Examples are shown in FIG. 10A and FIG. 10B. The set of candidate shapes (e.g., 3D primitives) can be learned, predetermined, manually determined, and/or otherwise determined. In an example, polyhedrons can be fit to 3D geometric representations (e.g., DSM, 3D model, etc.) of a set of training property components (e.g., during training of a parameter model, before training a parameter model, etc.), wherein the set of candidate polyhedrons can be determined based on the fit polyhedrons. In examples, the set of candidate polyhedrons can be determined using a model (e.g., using clustering methods, segmentation methods, etc.), directly extracted from the shape parameter values of the fit polyhedrons (e.g., number of faces, orientation, etc.), predetermined, manually determined, and/or otherwise determined. In an example, the set of candidate shapes can include one or more shape classes, wherein each shape class is defined by a set of constrained shape parameters and a set of partially or fully unconstrained shape parameters. In a specific example, the set of candidate shapes includes all trapezoidal prisms, wherein each candidate trapezoidal prism can be transformed using seven shape parameters (e.g., parameters 1-7, as depicted in FIG. 10A). Values for the shape parameters can optionally be partially constrained. For example, the length of one or more edges (e.g., parameter 1+parameter 2+parameter 3, as depicted in FIG. 10A; parameter 4+parameter 5+parameter 6, as depicted in FIG. 10A; etc.) can be defined (e.g., set to 1 for a normalized roof geometry, set to a length determined based on the 3D geometric representation, etc.). In a specific example, each candidate shape can have five degrees of freedom (e.g., 7 shape parameters with two constraints). The candidate shape can optionally be additionally transformed using values for one or more position parameters (e.g., x and y position) and/or one or more orientation parameters (e.g., rotation).

Property component parameter values are preferably determined automatically by one or more models (e.g., a parameter model, object detector, etc.), but can additionally and/or alternatively be determined manually (e.g., entered into an interface, selected on an image, etc.), and/or otherwise determined.

Determining property component parameter values can optionally include determining a property component boundary (e.g., a roof boundary), which can function to detect the boundary of a built structure within the property. Property component parameter values can optionally be determined based on the property component boundary. The property component boundary can optionally be determined using a segmentation model (e.g., a roof segmentation model trained to identify a roof segment, etc.), and/or any other suitable model. In a first example, property component features can be determined from within the boundary (e.g., pixels within the boundary; a constrained region of the property measurements). In a second example, the property component boundary can be used as an input to a model (e.g., the roof boundary can act as a constraint used in a parameter model and/or any other model).

In a first variant (e.g., mesh fitting variants, graph-based reconstruction variants), S300 can include detecting or extracting property component features (e.g., vertices, faces, edges, machine learning features, nonsemantic features, etc.) from a set of 2D measurements using a trained parameter model (or set thereof). In specific examples, the parameter model can include an auto regressor, a neural network (e.g., a CNN), feature extractor (e.g., edge feature extractor, HOG feature extractor, etc.), an encoder, a set of embedding layers, and/or any other suitable model. The parameter model can output: coordinates (e.g., cartesian coordinates) defining the property component features within the image(s), set of pixel identifiers for each feature, an annotated version of the image, an embedding of the image or property component segment, and/or any other suitable representation of the positions of identified property component features. The parameter model can optionally be trained using images labeled with property component feature labels, wherein the property component feature labels can label the property component features and/or values for property component feature parameters in the images. The property component feature labels can be: manually determined, determined using 3D measurements (e.g., determined from a sparse geometric representation of the property registered with the respective image), simulated (e.g., using simulated 3D measurements), predetermined, and/or otherwise determined. In a first example, the parameter model can be an edge corner, or ridge detector (e.g., trained to identify image regions having a strong gradient magnitude, high levels of curvature in the image gradient, etc.). In a second example, the model can be trained by: identifying features of interest within a sparse geometric representation (e.g., a sparse 3D model, such as a DSM or point cloud) of a training property, determining the corresponding features (e.g., pixels) in the 2D imagery corresponding to the sparse 3D model, and training the model to extract the corresponding features from 2D imagery. The features of interest can be identified based on the respective and surrounding feature heights within the sparse geometric representation, manually identified, and/or otherwise identified. For example, an edge can be identified as a set of voxels that are substantially linearly aligned and locally tallest or shortest height and a vertex can be a set of voxels (or single voxel) that is the local maxima or minima; however, the features can be otherwise defined. In a third example, the model can be trained to identify manually-labeled features. In a fourth example, the model can be trained to extract an embedding (e.g., set of image features or machine learning features, a feature vector, etc.) that can be used to predict a set of polyhedrons, a 3D model, or other training target. However, the model can be otherwise trained.

In a second variant (e.g., graph-based reconstruction variant), S300 can include determining property component features (e.g., vertices, faces, edges, etc.) and further determining the heights (e.g., z value, relative to ground, etc.) for one or more property component regions. The property component region can be a property component feature and/or region associated with (e.g., surrounding, near, etc.) one or more property component features. For example, roof features and their positions (e.g., x and y values) can be determined using a parameter model (e.g., using the previous variant), based on: one or more 2D images of the property and/or any other parameter model inputs. The heights (e.g., z values) of a roof feature and/or other roof region can be determined based on: the same 2D image(s) used to determine a roof feature, a sparse and/or inaccurate geometric representation of the property (e.g., surface map, DSM, 3D model generated from registered imagery, such as stereoimages, etc.), other 2D measurements and/or 3D measurements, values for contextual parameters (e.g., sun pose, descriptions, etc.), and/or otherwise determined. The heights can be determined using a parameter model, directly extracted from a measurement (e.g., retrieved z value from a set of points in a DSM), manually input (e.g., by a user), and/or otherwise determined.

Figure 8A:
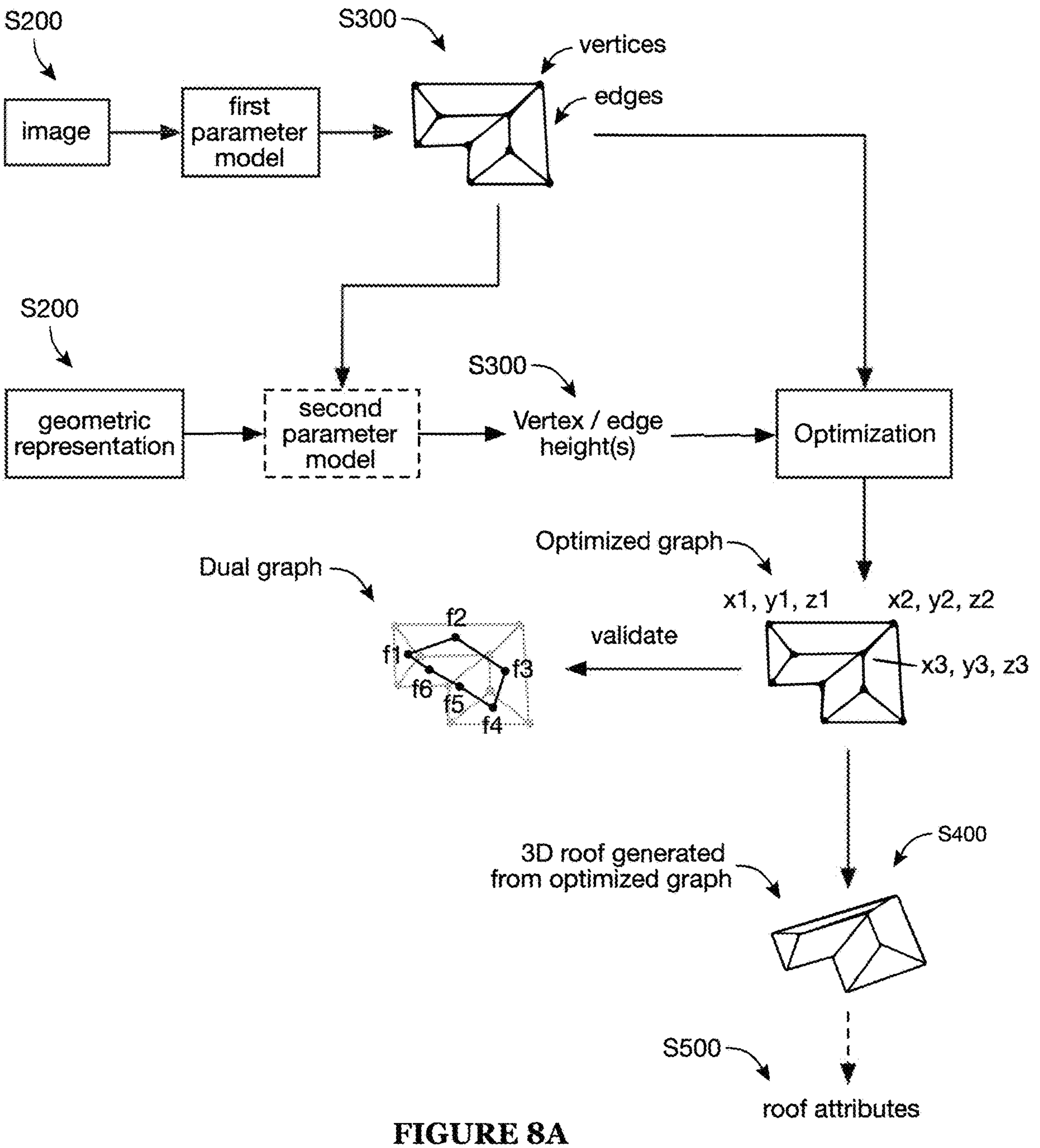
FIGS. 8A-8B depict illustrative examples of a variant of the method (e.g., graph-based reconstruction variant).
Figure 8B:
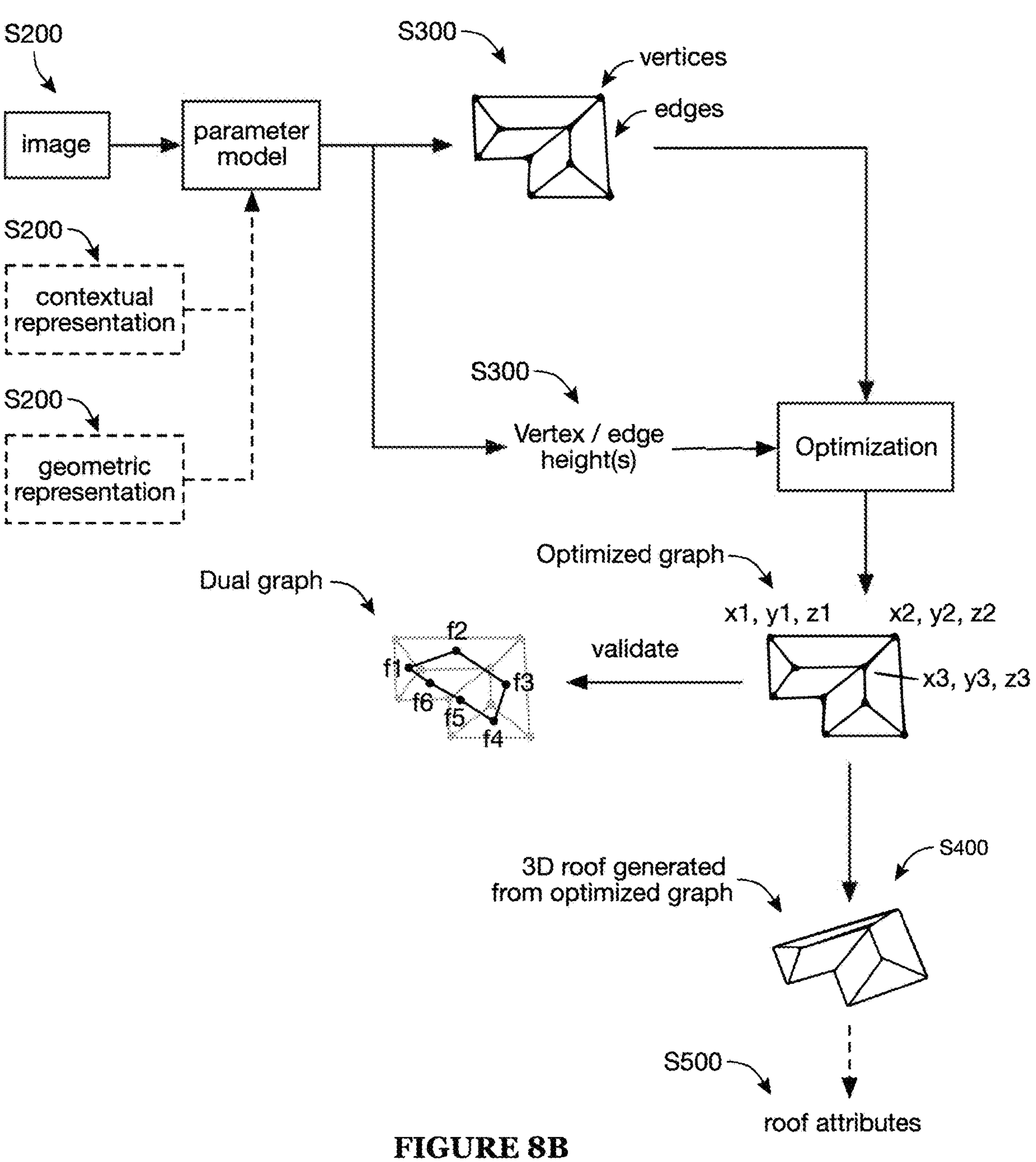

A single parameter model can be trained to determine a property component feature and its height (e.g., its 3D position), or multiple models can be used to determine a property component feature and its height. In a first example, x and y values for each roof feature can be detected in a 2D image using a first parameter model (e.g., using the previous variant), and z values for each roof feature can be determined by determining the corresponding locations within a 3D geometric representation (e.g., DSM) of the property (registered to the 2D image) and extracting the corresponding z values using a second parameter model. An example is shown in FIG. 8A. In a second example, a single parameter model can be trained to output the x, y, and z coordinates for one or more roof features based on: one or more 2D images, contextual parameters associated with the one or more 2D images, and/or a 3D geometric representation (e.g., DSM). An example is shown in FIG. 8B. In a specific example, the single parameter model can be trained using images labeled with roof feature labels (e.g., labeling the roof features and corresponding x, y, and z coordinates in the images), wherein the roof feature labels can be: manually determined, determined using 3D measurements (e.g., a sparse geometric representation of the property registered with the respective image), determined using simulated 3D measurements, predetermined, and/or otherwise determined. In an illustrative example, the single parameter model can be trained by: detecting roof features and their (x, y) coordinates in a 2D image (e.g., using a first parameter model, as described in the previous variant), determining corresponding z coordinates for the roof features using a real or simulated 3D geometric representation (e.g., DSM) registered to the 2D image, and subsequently training a single model to output the roof features and their (x, y, z) coordinates using end-to-end learning. In a third example, x and y values for each roof feature can be detected in a 2D image using a first parameter model (e.g., using the previous variant), and a height of all or a subset of the roof features can be determined by: determining a shadow height in the 2D image height and estimating the height of a roof feature based on the shadow height and contextual parameters (e.g., sun pose). However, the height for all or a subset of property component features can be otherwise determined. References to roof herein can be understood to equally apply to other property components.

In a third variant (e.g., polyhedron variant), S300 can include determining a set of constituent geometric shapes (and optionally shape parameter values for each constituent geometric shape) based on: a 2D measurement of the property, a 3D geometric representation of the property, a combination thereof, and/or other property information (e.g., contextual parameter values).

Figure 9:
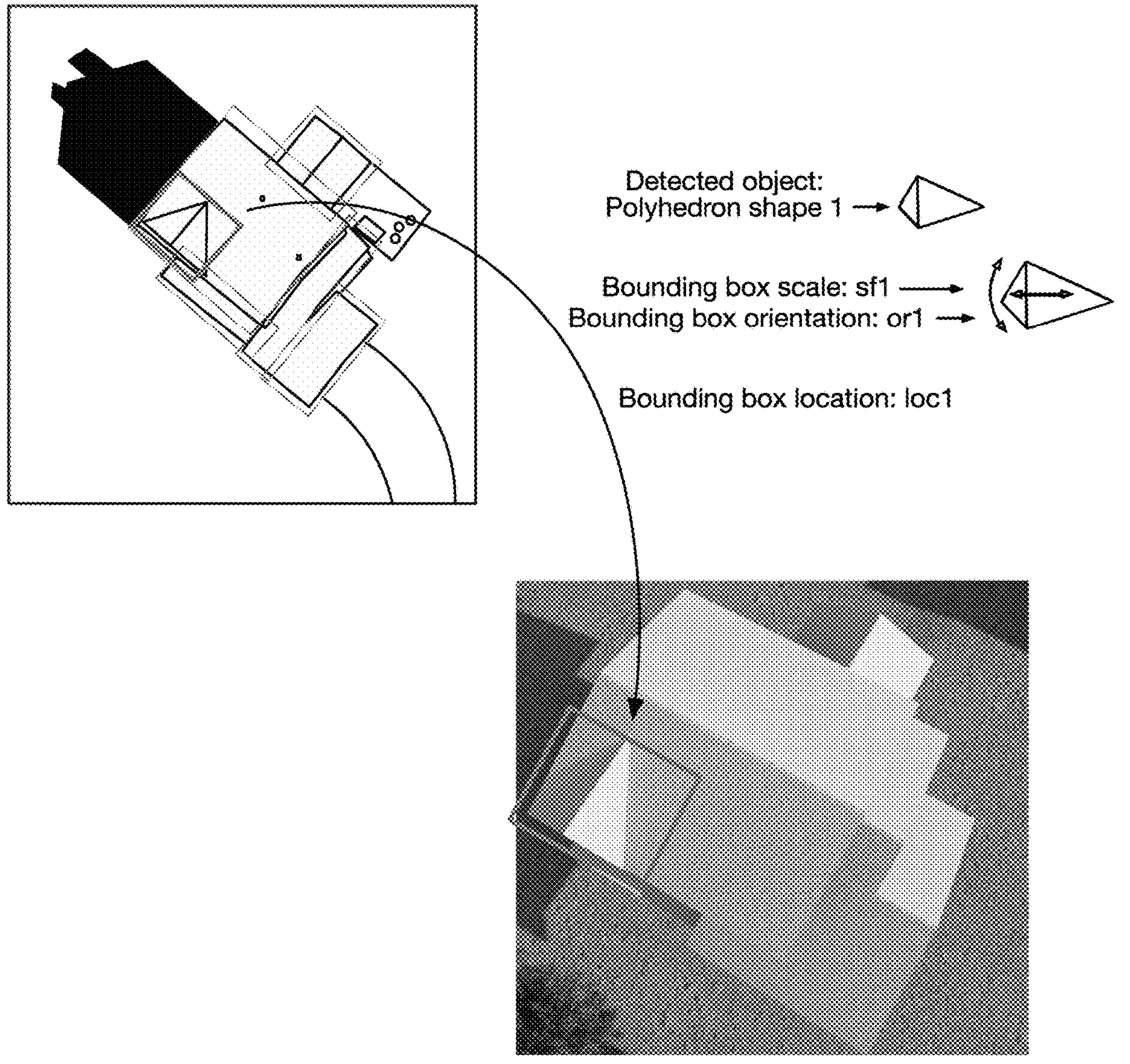
FIG. 9 depicts an illustrative example of a variant of the method (e.g., polyhedron variant).

The set of constituent geometric shapes can be detected using a parameter model that includes one or more object detectors. For example, the parameter model can output a set of detected shapes (e.g., a bounding box for each shape), each associated with values for a set of shape parameters (e.g., shape class, position, orientation, size, etc.). An example is shown in FIG. 9. In an example, detecting a set of polyhedrons can include determining a set of bounding boxes (e.g., based on a 2D measurement) using the object detector, wherein each bounding box corresponds to a polyhedron in the set of polyhedrons. The model can determine the polyhedrons, bounding boxes, and/or parameter values thereof based on property component features extracted from the 2D measurement (e.g., edges, vertices, machine learning features, non-semantic features, etc.); by using shape fitting; and/or otherwise determined. Detecting a set of polyhedrons using the object detector can optionally include selecting each polyhedron in the set of polyhedrons from the candidate polyhedrons (e.g., a subspace of polyhedrons). In a first example, a single object detector can be trained to detect all shapes within a shape class. In a specific example, an object detector can output a bounding box and, optionally, shape parameter values (e.g., values for parameters 1-7, as depicted in FIG. 10A). In a second example, a single object detector can be trained to detect multiple shape classes. In a specific example, the object detector (e.g., an object detector that includes a classifier) can output a bounding box labeled with a shape class and, optionally, shape parameter values. In a third example, multiple object detectors can each be trained to detect a different shape class (e.g., polyhedron class or other 3D object type). Each object detector can optionally be specific to a polyhedron scale, and/or any other suitable shape parameter values. In a specific example, an object detector specific to a shape class can output a bounding box (corresponding to the respective shape class of the object detector) and, optionally, shape parameter values.

Multiple parameter models can optionally be used to determine shape parameter values for a detected constituent geometric shape. In a specific example, a first parameter model can be used to determine values for height and a first set of shape parameters (e.g., values for parameters 1-7, as depicted in FIG. 10A; based on a 2D measurement and/or a 3D geometric representation), and a second parameter model can be used to determine position and/or orientation parameter values (e.g., based on a 2D measurement).

Figure 5A:
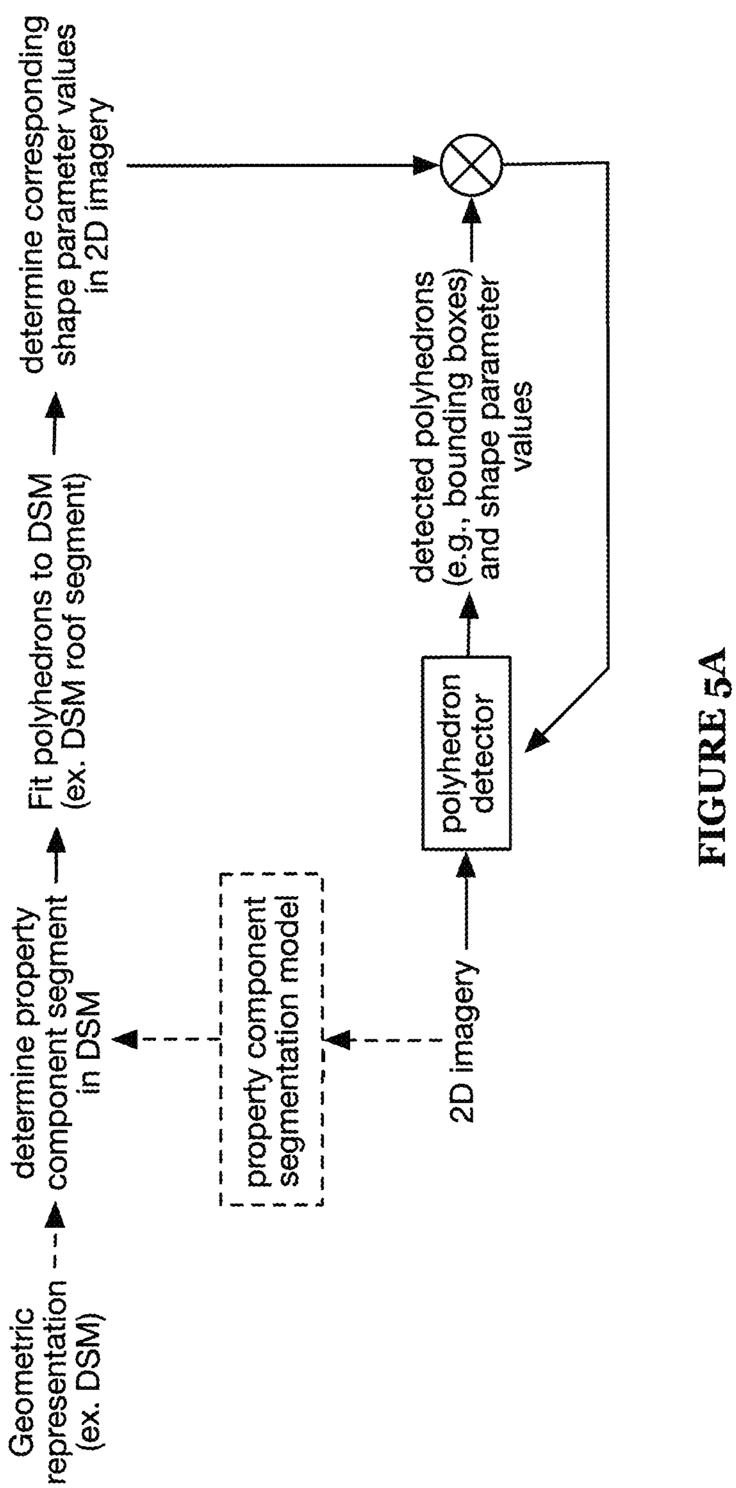
FIGS. 5A-5C depict examples of training a polyhedron detector.

In a first embodiment, the object detector can be trained to predict manually-determined bounding boxes of polyhedrons from a 2D image. In a second embodiment, the object detector can be trained by: fitting shapes (e.g., polyhedrons) to a 3D geometric representation of a training property component (e.g., sparse representation, such as the DSM; a simulated DSM; etc.), to vertices and/or other property component features extracted from imagery (e.g., 2D RGB imagery) of the training property component (e.g., training roof), and/or to other property information; and training the object detector to detect the fitted shape and/or associated shape parameter values (e.g., the training target) based on 2D measurements and/or other property information (e.g., contextual parameter values) of the training property component (e.g., wherein the training target can include a projection of the fitted 3D shape into the 2D measurement). An example is shown in FIG. 5A. The geometric shapes can be fit to the 3D geometric representation by: fitting a set of geometric shapes to each section of the sparse geometric representation and selecting a best-fit geometric shape for the region; fitting a set of planes to the sparse geometric representation and merging the planes into a geometric shape; using manually fitted shapes; using a greedy optimization (e.g., fitting progressively smaller shapes); using other optimization methods; using regression; and/or otherwise fitting geometric shapes to the 3D geometric representation (e.g., fitting polyhedrons to the DSM or point cloud). Fitting can include addition and/or subtraction of shapes (e.g., constructive solids geometry modeling). In a specific example, fitting shapes can include progressively selecting and fitting the candidate shape (e.g., a primitive) that can be fit to all or a portion of the 3D representation, from: largest volume to smallest volume, from the least complex to most complex candidate shape, from the most complex to least complex candidate shape, and/or in any other order. Each candidate shape can be used once, multiple times, not used, and/or used any other number of times for a property.

Figure 5B:
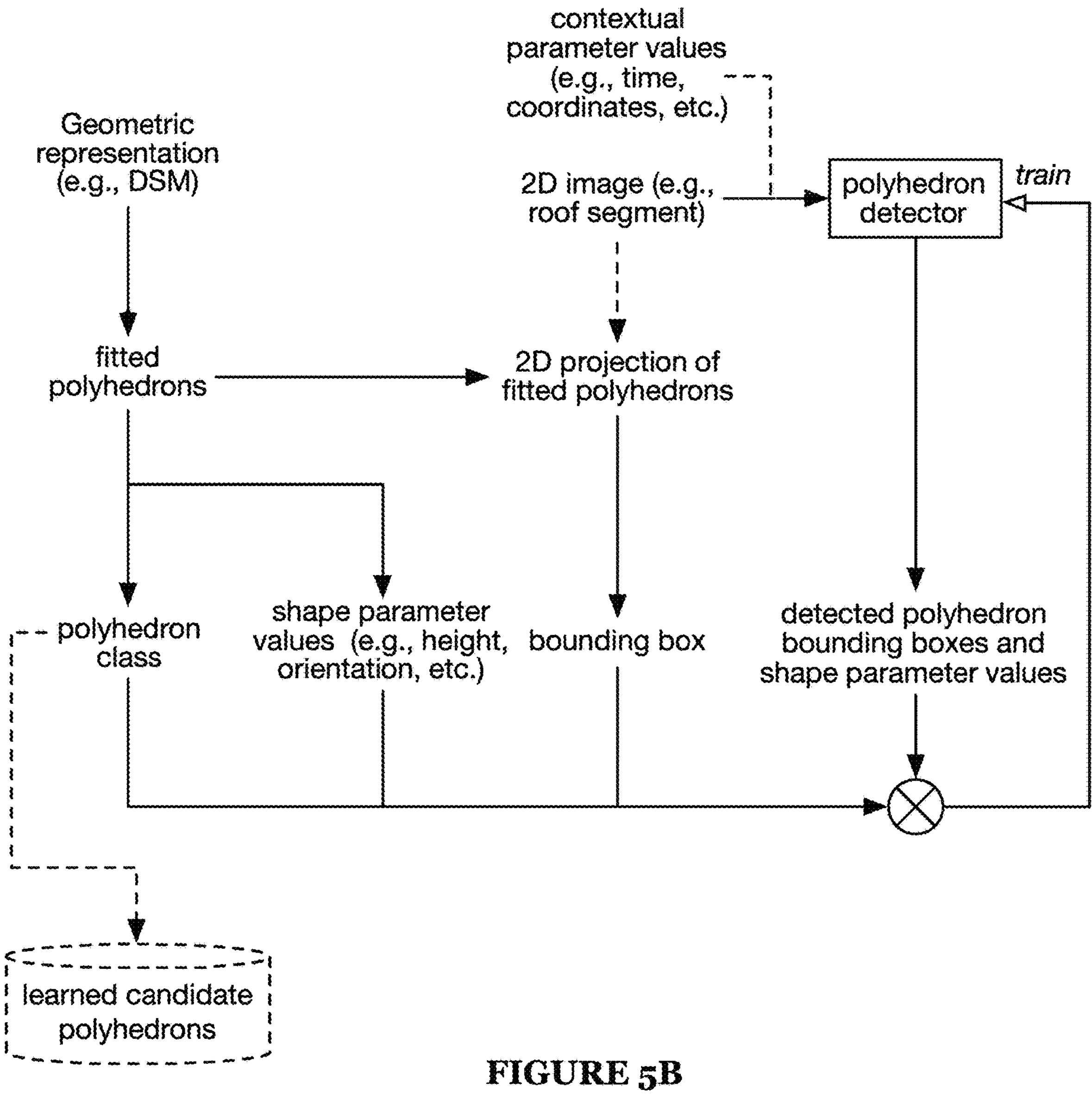
Figure 5C:
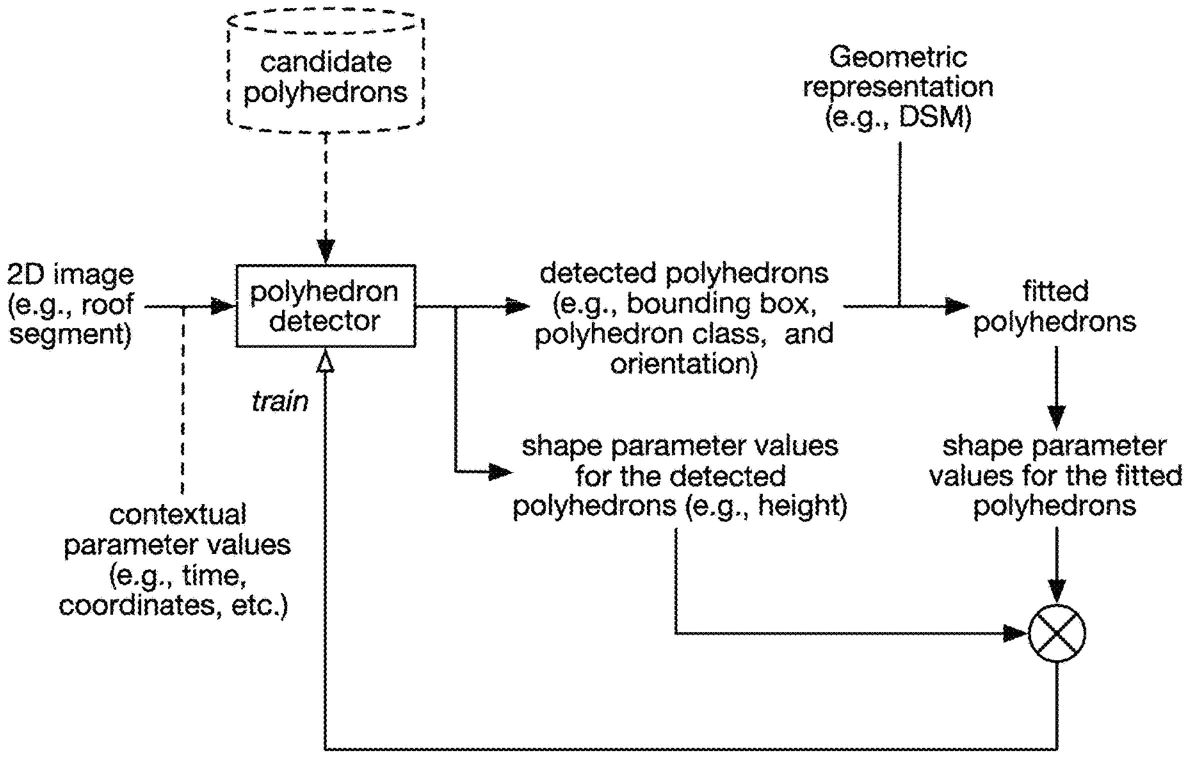

In a first example, the object detector can be trained by, for a training property: fitting training polyhedrons to a 3D geometric representation depicting the training property; for each fitted training polyhedron, determining a training bounding box in a training 2D measurement corresponding to the 3D geometric representation (e.g., projecting the fitted training polyhedron into the training 2D measurement); optionally determining training shape parameter values for each fitted training polyhedron; training the object detector to output the training bounding boxes based on the training 2D measurement; and optionally training the object detector to output the training shape parameter values based on the training 2D measurement. In a specific example, training the object detector can include: fitting shapes to a 3D geometric representation of the property component (e.g., simulated or real DSM); determining the shape parameter values based on the fitted shapes; determining the corresponding shape bounding boxes in a 2D image registered with the 3D model; and training the object detector to detect the shapes (e.g., the bounding boxes labeled with a shape class) and/or the shape parameter values from the 2D image of the property component (and, optionally, contextual parameter values). An example is shown in FIG. 5B. The shape bounding boxes within the 2D image that correspond to the fitted shapes can be determined by projecting the fitted polyhedrons into the 2D image; by determining a bounding box encompassing the image region corresponding to the fitted shape based on the shape parameter values; and/or otherwise determined. In a second example, the object detector can be trained by: using an object detector or a portion thereof to detect shapes, outputting the bounding boxes (e.g., with shape classes and orientations) based on a 2D image and/or contextual parameter values; fitting the detected shapes to a 3D geometric representation; determining shape parameter values (e.g., height) for each fitted shape; and retraining the object detector or training a new object detector (e.g., a single-stage YOLO) using end-to-end learning with the shape parameter values as a training target (e.g., example shown in FIGURE SC).

However, the object detector can be otherwise trained.

However, the set of constituent geometric shapes can be otherwise determined.

However, the property component features for the property can be otherwise determined.

3.4. Determining a 3D Model Based on Property Component Parameter Values S400.

Determining a 3D model based on property component parameter values S400 can function to generate a model that can be used to accurately represent the property component and facilitate property analysis (e.g., property component analysis). In an example, the 3D model can be a 3D roof model. S400 can be performed using one or more models, algorithms (e.g., optimization algorithm, linear regression, etc.), heuristics, and/or other methods. The 3D model can be generated based on: the property information determined in S200, values for property component parameters (e.g., roof features, roof feature parameters, etc.) determined in S300, and/or any other suitable set of information. In variants, S400 can include: determining an intermediate (e.g., coarse) representation (e.g., model) of the property component S401 (e.g., wireframe mesh, graph, grouping of polyhedrons, etc.), refining the intermediate representation S402 (e.g., via optimization), and determining the 3D model based on the refined intermediate representation S403. Additionally or alternatively, S400 can include constructing a 3D model based on the output of S300 directly.

Determining an intermediate representation of the property component S401 can function to transform the extracted values for property component parameters (e.g., positions, poses, shapes, sizes, etc.) into a form that can be optimized and/or otherwise mathematically operated on. Refining the intermediate representation S402 can function to generate a 3D model (e.g., 3D roof model and/or any other 3D property component model).

Figure 7:
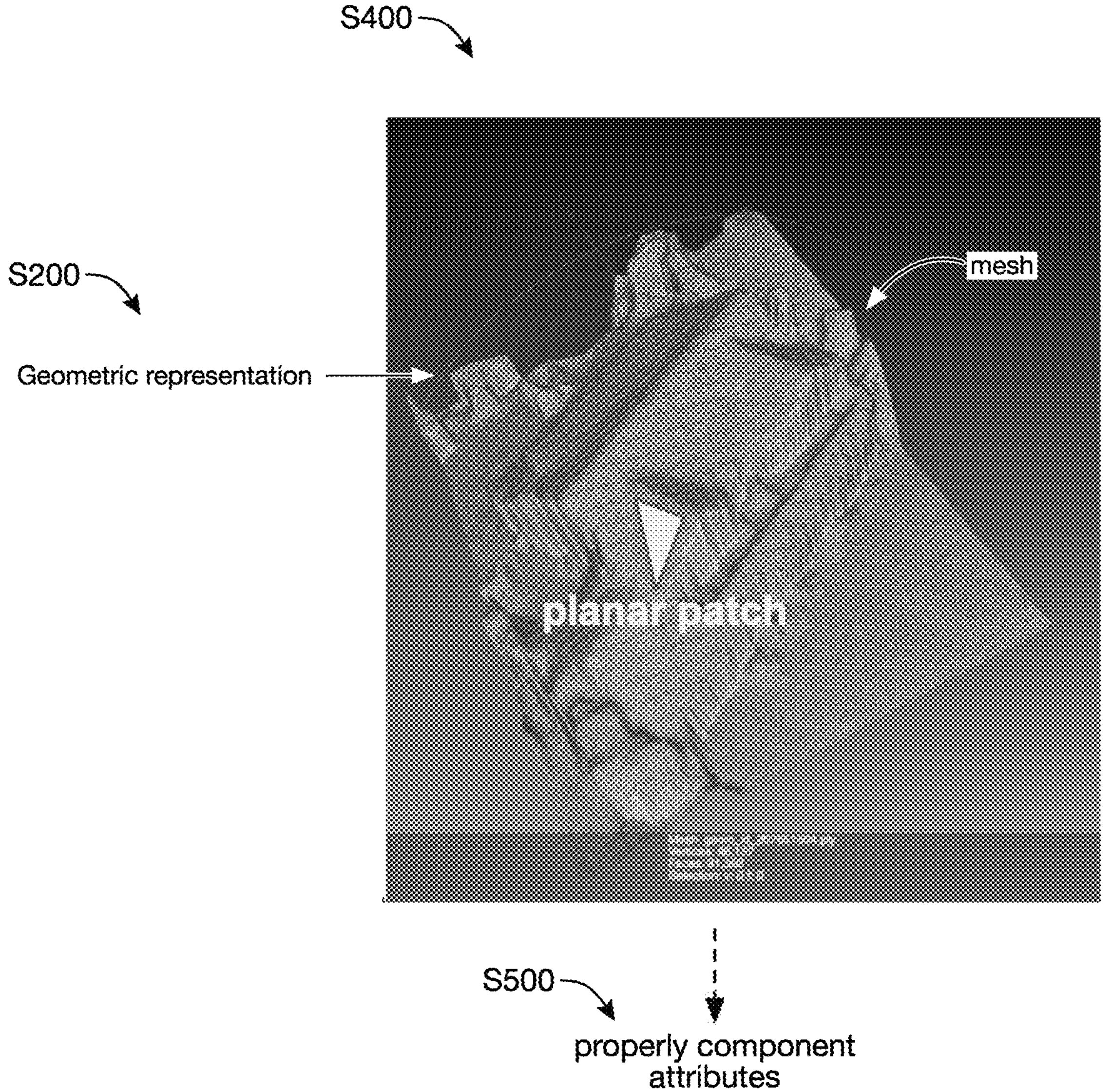
FIG. 7 depicts an illustrative example of a variant of the method (e.g., mesh fitting variant).

In a first variant (e.g., mesh fitting variant), S401 can include fitting a mesh to a sparse geometric representation, S402 can include refining the mesh, and S403 can include determining the 3D model based on the refined mesh. An example is shown in FIG. 7. Preferably, the sparse geometric representation is a DSM and/or other geometric representation that includes 3D points (e.g., x, y, z) defining the property component structure. Additionally or alternatively, the sparse geometric representation can contain a set of points and/or other geometries defining a set of property component features (e.g., vertex, face, edge, etc.) (e.g., extracted from 2D images). Meshes can be: wireframe mesh, surface mesh, structured mesh, unstructured mesh, triangle mesh, quad mesh, polygon mesh, and/or any other mesh. Fitting a mesh can use algebraic methods, differential equation methods (e.g., elliptic schemes, hyperbolic schemes, etc.), variational methods, unstructured grid generation, adaptive grid, and/or any other meshing techniques. Refining the mesh can include optimizing the mesh using a set of property component parameter values (e.g., vertices, faces, edges, z values, appearance-based features, etc.) determined in S30 as constraints. In an example, a 3D property component structured can be defined by planes fit to the mesh and associated property component features. Plane fitting can be: concurrent (e.g., using global optimization with a fixed number of planes estimated from a roof complexity model, etc.), progressive (e.g., using greedy optimization starting with the largest possible plane), and/or otherwise executed. Further constraints for the optimization can include: topology constraints, slope constraints, planarity constraints, similarity constraints, and/or other suitable constraints. Determining the 3D model based on the refined mesh can include (directly) using the refined mesh as the 3D model (e.g., the refined mesh is the 3D model), and/or generating the 3D model based on the refined mesh (e.g., based on values for dimensions and/or other parameters of the refined mesh).

In a second variant (e.g., graph-based reconstruction variant), S401 can include determining a graph based on the property component parameter values (e.g., roof features) to encode the property component topology, S402 can include optimizing the graph, and S403 can include determining the 3D model based on the optimized graph. The graph can be formed from all or a subset of property component features (e.g., vertices, edges, roof face representations, etc.), property component feature parameter values (e.g., x and y locations of the features), and/or other property component parameter values. In an example, each property component feature can map to one or more components of the graph (e.g., vertices, edges, etc.). In a specific example, key points of the property component (e.g., vertices) and respective x, y locations for each key point can be determined via S300 (e.g., extracted from a single 2D image, from multiple 2D images, etc.) and used to generate the graph. In another specific example, a property component face representation (e.g., a centroid of a roof face) and/or position thereof (e.g., x, y coordinates) can be used to determine the graph. A property component face representation can optionally be determined based on: edges and vertices (e.g., based on the positions of the edges and/or vertices), the 3D model proposed by a set of candidate edge and vertex values, the sparse geometric representation, and/or otherwise determined.

In an embodiment, the graph can be represented as a set of vertices and edges: G=(V, E), wherein the vertices and edges can be determined in S300 (e.g., from the 2D image). Additionally or alternatively, a face set can be extracted from the edge set, or alternatively as a set of vertices and faces: G=(V, F). Additionally or alternatively, a dual graph can be constructed where each face (e.g., roof face) is represented as a node, and two nodes are connected to each other if the corresponding faces are adjacent.

The graph can be optimized based on: one or more heights (e.g., heights for all or a subset of the property component features extracted in S300), a set of constraints, and/or any other suitable information. The set of constraints can include: planarity constraints (e.g., each roof face is planar), height constraints (e.g., the roof has non-zero height, the feature heights must be within a predetermined range of the feature heights extracted from the sparse geometric representation, etc.), topology constraints, slope constraints, similarity constraints, slope constraint, each 3D property component embedding can be projected into 2D space, the resultant face graph must be valid (e.g., face graph validity constraint; the faces must be planar, adjacent faces must meet at an edge or vertex, etc.), and/or other constraints. Constraints can include hard constraints, soft constraints, and/or a combination thereof.

For example, the method can include: determining a 2D measurement depicting a property; determining a 3D geometric representation depicting the property; using a first model (e.g., first parameter model), determining a graph based on the 2D measurement; using a second model (e.g., second parameter model), determining a set of heights for the graph based on the 3D geometric representation; optimizing the graph based on the set of heights; and generating a 3D model (e.g., roof model) of the property based on the optimized graph. In a specific example, determining the graph can include: extracting property component features (e.g., roof features) from the 2D measurement using the first model (e.g., S300), and determining the graph based on the set of property component features (e.g., wherein the set of heights used to optimize the graph can include heights for all or a subset of the set of property component features).

In an example, optimizing the graph can include constraining optimization of the graph based on a set of heights (e.g., determined via S300). The set of heights preferably includes at least two heights (e.g., for at least two property component features, for a single property component feature, etc.), but can alternatively include a single height. In a specific example, optimizing the graph can include constraining optimization of the graph using a set of height constraints, wherein each height constraint can be or include a feature height (e.g., determined via S300). In an illustrative example, a height corresponding to one or more components of the graph (e.g., vertices and/or edges) can be set to match a feature height determined based on a 3D geometric representation (e.g., DSM). In another specific example, optimizing the graph can include constraining optimization of the graph using a set of height constraints, wherein each height constraint can include a height range determined based on a feature height (e.g., determined via S300). In an illustrative example, the height range can be centered on the feature height. The height range can optionally be associated with a confidence parameter (e.g., a vertical accuracy parameter) corresponding to a 3D geometric representation (e.g., DSM) used to determine the feature height.

In an example, a component of the graph (before optimization) can optionally correspond to two different heights. In an illustrative example, for a gable roof, a single roof feature (e.g., a vertex extracted from a 2D image of the roof)—mapped to a component of the graph (e.g., a node, edge, etc.)—can correspond to both a top surface of the gable and a base of the respective gable end. In a first example, the method can include, determining a first height and a second height for a roof feature and/or for the corresponding graph component, the second height different from the first height. In a specific example, a 3D geometric representation of the roof can be used to determine the two (different) heights for the same roof feature (e.g., one height corresponding to the top surface of the gable and the other height corresponding to the base of the gable end). The corresponding graph component can optionally be separated into two different components, corresponding to the two different heights. Additionally or alternatively, the two heights can be assigned to the same graph component. In a second example, a gable end can be identified based on the 3D geometric representation (e.g., a straight facet can be identified), wherein the graph can be optimized based on the identified gable end. In a specific example, a corresponding roof feature (mapping to a single component of the graph) can be separated into two graph components to correspond to the top surface of the gable and the base of the gable end.

In an example, the graph can be optimized using:

$$\min_{x^i_{xyz} x^{j,k}_z} E_{planarity}(X) + \lambda \| \underline{X} - \underline{X}_{extracted} \|_F^2 + \eta \mathrm{Var}(x_z^j) + \eta \mathrm{Var}(x_z^k) \qquad (1)$$

where $$x^i_{xyz}$$

means that the xyz axis values for vertex i are variables for optimization, $$x_z^{j,k}$$

means that only z axis values for vertices j and k are variables for optimization (and the corresponding x and y values are fixed), $$E_{planarity}(X) = \sum_{a=1}^{n_f} \sigma_1(\mathrm{cov}(X_{fi}))$$

is a summation of a planarity metric $\sigma_1(\mathrm{cov}(X_{fi}))$ on each face $f_a$, $\underline{X}$ is a 3D embedding of the vertex set, $\underline{X}_{extracted}$ is a 2D embedding of the roof vertices extracted in S300, $$\mathrm{Var}(x_z^j)$$

and $$\mathrm{Var}(x_z^k)\sqrt{\mathrm{Var}(x_z^k)}$$

are optional energy terms to regularize the height of the j and k vertices, and $\eta$ is a weight (e.g., 0, 1, etc.). Equation 1 can be optimized by setting the height of one or more vertices (e.g., any vertex, tallest vertex, vertex with the most graph connections, etc.) to a height extracted from the sparse geometric representation (e.g., from S300), a range of heights (e.g., a range about a height determined in S300), a predetermined height, and/or any other height. In examples, this can result in a valid face graph F. In a specific example, the methods disclosed in Ren, J. et al. (2021) Intuitive and Efficient Roof Modeling for Reconstruction and Synthesis. *ACM Trans. Graph*., Vol. 40, No. 6, Article 249 can be used, except that the roof outline synthesis can be performed using key points extracted from the 2D image (e.g., using feature extractors), and/or the optimization can be performed using roof feature heights extracted from the geometric representation of the property (e.g., the DSM). However, the variant can be otherwise performed.

Additionally or alternatively, other methods (e.g., straight skeleton methods) can be used to construct a planar roof from the set of vertices and edges.

Additionally or alternatively, a final (e.g., optimized) graph can be directly determined from the property component features, using a trained model (e.g., without an optimization step). In a specific example, the model (e.g., a graph-based neural network) can take property component features and/or property component feature parameter values as an input, and output the final graph, wherein the 3D model can be generated from the final graph.

Figure 6:
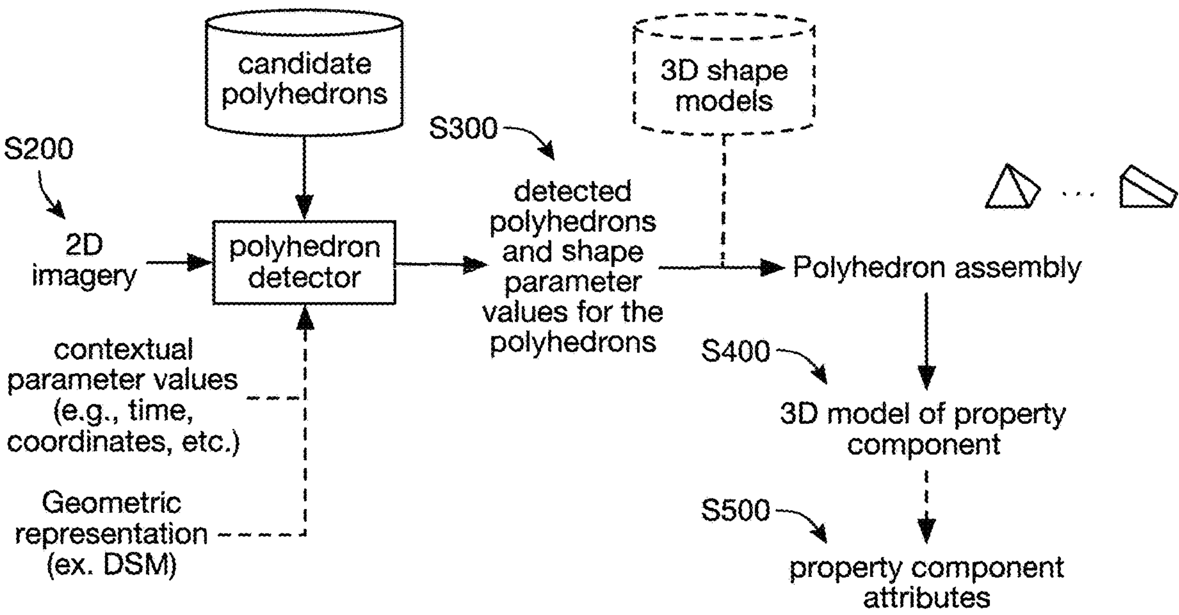
FIG. 6 depicts an example of inference for a variant of the method (e.g., polyhedron variant).
Figure 11:
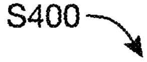
FIG. 11 depicts an illustrative example of determining a 3D model using a linear combination of polyhedrons.

In a third variant (e.g., polyhedron variant), S400 can include: determining a 3D model based on a set of constituent geometric shapes and shape parameter values (e.g., determined via S300). An example is shown in FIG. 6. For example, the method can include: using an object detector, based on a 2D measurement depicting a property, detecting a set of polyhedrons and determining shape parameter values for each polyhedron in the set of polyhedrons; and determining a 3D model (e.g., 3D roof model) for the property based on the set of polyhedrons and the shape parameter values for each polyhedron. In an example, detecting the set of polyhedrons can include selecting each polyhedron in the set of polyhedrons from a set of candidate polyhedrons. In an example, determining a 3D model for the property can include: retrieving 3D shape models for each of a set of geometric shapes detected in S300; transforming (e.g., manipulating, adjusting, etc.) the 3D shape models based on the respective shape parameter values (e.g., arranging the models in the respective pose, expanding or contracting the models based on the size and/or manipulation parameter values, etc.); and merging the 3D shape models into a 3D property component representation (e.g., 3D model). In a specific example, determining the 3D model (e.g., 3D roof model) for the property can include: for each of the set of polyhedrons, determining a 3D shape model for the polyhedron and transforming the 3D shape model based on the shape parameter values for the polyhedron; and performing a linear combination of the 3D shape models to determine the 3D model for the property (e.g., example shown in FIG. 11). In examples, the heights of 3D shape models are further determined (e.g., set, seeded, etc.) based on heights retrieved from the DSM of the property of interest, based on property component features (e.g., a roof height derived from contextual parameter values), and/or otherwise determined. Merging can involve taking a union, joining, determining a linear combination (e.g., sum), interpolating, intersecting, differencing, and/or otherwise combining the 3D shape models (e.g., Boolean operations on polyhedral). In an example, the set of constituent geometric shapes can be arranged according to their respective parameter values, and a 3D model generated from their intersection (e.g., using constructive solid geometry modeling).

In a fourth variant, a model (e.g., an autoencoder) can encode one or more measurements (e.g., one or more 2D images) into a representation, which can be decoded to generate the 3D model. In a specific example, S300 can include determining the representation (e.g., the property component features include the representation), and S400 can include decoding the representation to generate the 3D model. The model can be trained using training 2D images and corresponding training 3D models (e.g., manually generated, generated using one or more other variants, etc.).

In examples, the property component parameter values (e.g., roof parameter values), property component features (e.g., roof features), property component feature parameter values (e.g., roof feature parameter values), and/or the 3D model can be determined for a property: multiple using views of the property, without using stereopsis, without using 3D measurements of the property (e.g., 3D geometric representations), only using 2D measurements of the property, only using a single 2D measurement of the property, without using multiple 2D measurements of the property, only using 3D geometric representations (e.g., DSM) of the property, only using a single 2D measurement and a single 3D geometric representation of the property, without more than one image of the property, and/or with any other constraints.

However, the 3D model can be otherwise determined.

3.5. Determining a Set of Property Attributes S500.

The method can optionally include determining a set of property attributes S500, which can function to determine a set of parameter values that summarize the attributes of the property or property component (e.g., geometry of the roof). S500 can be performed after S400, executed upon receipt of a request (e.g., individually upon receipt of information for a specific property, in a batch for a set of properties, etc.), and/or performed at any other time. A set of property attributes can be determined (e.g., in a batch) and stored for later use. Property attributes are preferably determined from the 3D model (e.g., output of S400), but can be otherwise determined. In a specific example, the method can include extracting roof attributes from a 3D roof model. The property attributes (e.g., roof attributes) can optionally be provided to a user. Additionally or alternatively, a model can be trained to determine property attributes from property information and/or the property component features, without creating a 3D model.

In examples, roof attributes can include: physical or geometric attributes of the roof (e.g., slope, pitch, surface area, roof complexity, etc.), relationships between roof facets or other features, presence or absence of an improvement (e.g., solar panel, etc.), ratios or comparisons therebetween, condition, material, roof geometry classification (e.g., hip, gable, etc.), percent thereof, and/or any other structural descriptors. The property attributes can be determined using attribute extraction models (e.g., geometric models, machine learning models, etc.). Examples of roof attributes that can be extracted include: roof dimensions; roof footprint; roof surface area; number of roof facets; number of edges; pitch per face; dominant roof pitch; average roof pitch; roof slope; roof pitch; facet slope; facet area; the number, location, area, dimensions (e.g., linear dimensions), and/or slope of: valleys, ridges, dormers, and/or other roof features; roof height difference; building height; roof complexity (e.g., number of ridges; number of valleys; the number of, and/or arrangement of, facets that make up the roof; roof topology; etc.); distance between facets; facet density; setback distance; and/or other roof attributes. However, other attributes of other property components (e.g., size, shape, position, orientation, etc.) can also be extracted using one or more models.

However, the attributes for the property can be otherwise determined.

6. USE CASES

In examples, the determined property attributes (e.g., property component attributes), such as roof attributes, can be used to: determine other property attributes, calculate the volume of a building (e.g., heated living area, total volume, etc.), determine partial story presence, determine property valuation, determine roof replacement cost, determine a vulnerability assessment, determine the amount of roofing material needed, to identify potential areas of repairs/renovation by being aware of what aspects of the property significantly contribute to the value while getting the property ready for listing, to supplement a property-level valuation report, to detect error in other valuation methods, and/or otherwise used. The 3D model, property attributes and/or derived information can be provided as a report, programmatically (e.g., via an API), and/or otherwise provided to a user for subsequent use. In a specific example, a 3D model can be displayed as a visualization of the property component (e.g., roof). However, the property attributes and/or other information can be otherwise used.

All or portions of the methods described above can be used for automated property valuation, for insurance purposes, and/or otherwise used. For example, any of the outputs discussed above (e.g., for the property) can be provided to an automated valuation model (AVM), which can predict a property value based on one or more of the attribute values (e.g., feature values), generated by the one or more models discussed above, and/or attribute value-associated information. The AVM can be: retrieved from a database 120, determined dynamically, and/or otherwise determined.

7. SPECIFIC EXAMPLES

A numbered list of specific examples of the technology described herein are provided below. A person of skill in the art will recognize that the scope of the technology is not limited to and/or by these specific examples.

Specific Example 1. A method, comprising: determining a 2D measurement depicting a property; using an object detector, based on the 2D measurement: detecting a set of polyhedrons, comprising selecting each polyhedron in the set of polyhedrons from a set of candidate polyhedrons; and determining shape parameter values for each polyhedron in the set of polyhedrons; and determining a 3D roof model for the property based on the set of polyhedrons and the shape parameter values for each polyhedron.

Specific Example 2. The method of Specific Example 1, wherein detecting the set of polyhedrons comprises determining a set of bounding boxes based on the 2D measurement using the object detector, wherein each bounding box corresponds to a polyhedron in the set of polyhedrons.

Specific Example 3. The method of any of Specific Examples 1 or 2, wherein the object detector is trained by, for a training property: fitting training polyhedrons to a 3D geometric representation depicting the training property; for each fitted training polyhedron, determining a training bounding box in a training 2D measurement corresponding to the 3D geometric representation; and training the object detector to output the training bounding boxes based on the training 2D measurement.

Specific Example 4. The method of any of Specific Examples 1-3, wherein the 3D roof model for the property is determined without using 3D measurements of the property.

Specific Example 5. The method of Specific Example 3, wherein, for each fitted training polyhedron, determining the training bounding box comprises projecting the fitted training polyhedron into the training 2D measurement.

Specific Example 6. The method of Specific Example 3, wherein the object detector is further trained by, for the training property: determining training shape parameter values for each fitted training polyhedron; and training the object detector to output the training shape parameter values.

Specific Example 7. The method of Specific Example 1, wherein the set of candidate polyhedrons comprises a subspace of polyhedrons.

Specific Example 8. The method of Specific Example 1, wherein the 3D roof model for the property is determined without using multiple 2D measurements of the property.

Specific Example 9. The method of Specific Example 1, wherein the shape parameter values comprise values for at least one of: position, orientation, or dimensions.

Specific Example 10. The method of Specific Example 1, wherein determining the 3D roof model for the property comprises: for each of the set of polyhedrons: determining a 3D shape model for the polyhedron; and transforming the 3D shape model based on the shape parameter values for the polyhedron; and performing a linear combination of the 3D shape models to determine the 3D roof model for the property.

Specific Example 11. The method of Specific Example 1, wherein the shape parameter values for each polyhedron are determined based on contextual parameter values associated with the 2D measurement, wherein the contextual parameter values comprise values for at least one of a time of day, a date, or a location.

Specific Example 12. The method of Specific Example 1, further comprising extracting roof attributes from the 3D roof model, wherein the roof attributes are provided to a user.

Specific Example 13. The method of Specific Example 1, further comprising determining a roof complexity based on the 3D roof model.

Specific Example 14. A method, comprising: determining a 2D measurement depicting a property; determining a 3D geometric representation depicting the property; using a first model, determining a graph based on the 2D measurement; using a second model, determining a set of heights for the graph based on the 3D geometric representation; optimizing the graph based on the set of heights; and generating a 3D roof model of the property based on the optimized graph.

Specific Example 15. The method of Specific Example 14, wherein the 3D geometric representation comprises a digital surface map registered to the 2D measurement.

Specific Example 16. The method of Specific Example 14, wherein determining the graph comprises: extracting roof features from the 2D measurement using the first model; and determining the graph based on the set of roof features; wherein the set of heights comprises heights for a subset of the set of roof features.

Specific Example 17. The method of Specific Example 14, wherein determining the set of heights for the graph comprises determining a first height for a roof feature and determining a second height for the roof feature, the second height different from the first height.

Specific Example 18. The method of Specific Example 14, wherein optimizing the graph comprises constraining optimization of the graph using a set of height constraints, wherein each height constraint comprises a height range determined based on a height in the set of heights.

Specific Example 19. The method of Specific Example 14, wherein optimizing the graph comprises constraining optimization of the graph based on the set of heights, wherein the set of heights comprises at least two heights.

Specific Example 20. The method of Specific Example 14, wherein the set of heights comprises a height for at least one of: a vertex, peak, valley, apex, or nadir of the property.

Specific Example 21. The method of Specific Example 14, further comprising determining a roof complexity based on the 3D roof model.

Different processes and/or elements discussed above can be performed and controlled by the same or different entities. In the latter variants, different subsystems can communicate via: APIs (e.g., using API requests and responses, API keys, etc.), requests, and/or other communication channels.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A method, comprising:

determining a 2D measurement depicting a property using a single image;

extracting, using an object detector of a parameter model, a property component feature of the 2D measurement;

detecting, using the object detector, a set of constituent geometric shapes of the property component feature, wherein the set of constituent geometric shapes cooperatively form a geometry of the property component feature;

extracting, using the object detector, a set of polyhedrons cooperatively representative of the geometry of the property component feature from the set of constituent geometric shapes;

determining, using the object detector, shape parameter values for each polyhedron in the set of polyhedrons; and fitting, using the parameter model, the set of polyhedrons to the geometry of the property component feature to produce a 3D roof model for the property based on the set of polyhedrons and the shape parameter values for each polyhedron, wherein the set of polyhedrons are generated based on the single image.

2. The method of claim 1, wherein detecting the set of polyhedrons comprises determining a set of bounding boxes based on the 2D measurement using the object detector, wherein each bounding box corresponds to a polyhedron in the set of polyhedrons.

3. The method of claim 2, wherein the object detector is trained by, for a training property:

fitting training polyhedrons to a 3D geometric representation depicting the training property;

for each fitted training polyhedron, determining a training bounding box in a training 2D measurement corresponding to the 3D geometric representation; and training the object detector to output the training bounding boxes based on the training 2D measurement.

4. The method of claim 3, wherein the 3D roof model for the property is determined without using 3D measurements of the property.

5. The method of claim 3, wherein, for each fitted training polyhedron, determining the training bounding box comprises projecting the fitted training polyhedron into the training 2D measurement.

6. The method of claim 3, wherein the object detector is further trained by, for the training property: determining training shape parameter values for each fitted training polyhedron; and training the object detector to output the training shape parameter values.

7. The method of claim 1, wherein the extracted set of polyhedrons are selected from a set of candidate polyhedrons.

8. The method of claim 1, wherein the shape parameter values comprise values for at least one of: position, orientation, or dimensions.

9. The method of claim 1, wherein fitting the set of polyhedrons to the geometry of the property component feature to produce the 3D roof model for the property comprises:

for each polyhedron of the set of polyhedrons:

determining a 3D shape model for the polyhedron based on the set of constituent geometric shapes; and transforming the 3D shape model based on the shape parameter values for the polyhedron; and performing a linear combination of the 3D shape models to produce the 3D roof model for the property.

10. The method of claim 1, wherein the shape parameter values for each polyhedron are determined based on contextual parameter values associated with the 2D measurement, wherein the contextual parameter values comprise values for at least one of a time of day, a date, or a location.

11. The method of claim 1, further comprising extracting roof attributes from the 3D roof model, wherein the roof attributes are provided to a user.

12. The method of claim 1, further comprising determining a roof complexity based on the 3D roof model.

13. A non-transitory computer-readable medium storing instructions that, when executed by one or more processors, cause the processor to:

determining a 2D measurement depicting a property using a single image;

extracting, using an object detector of a parameter model, a property component feature of the 2D measurement;

detecting, using the object detector, a set of constituent geometric shapes oof the property component feature, wherein the set of constituent geometric shapes cooperatively form a geometry of the property component feature;

extracting, using the object detector, a set of polyhedrons cooperatively representative of the geometry of the property component feature from the set of constituent geometric shapes;

determining, using the object detector, shape parameter values for each polyhedron in the set of polyhedrons; and fitting, using the parameter model, the set of polyhedrons to the geometry of the property component feature to produce a 3D roof model for the property based on the set of polyhedrons and the shape parameter values for each polyhedron, wherein the set of polyhedrons are generated based on the single image.

14. The computer-readable medium of claim 13, wherein detecting the set of polyhedrons comprises determining a set of bounding boxes based on the 2D measurement using the object detector, wherein each bounding box corresponds to a polyhedron in the set of polyhedrons.

15. The computer-readable medium of claim 14, wherein the object detector is trained by, for a training property: fitting training polyhedrons to a 3D geometric representation depicting the training property; for each fitted training polyhedron, determining a training bounding box in a training 2D measurement corresponding to the 3D geometric representation; and training the object detector to output the training bounding boxes based on the training 2D measurement.

16. The computer-readable medium of claim 15, wherein the 3D roof model for the property is determined without using 3D measurements of the property.

17. The computer-readable medium of claim 15, wherein, for each fitted training polyhedron, determining the training bounding box comprises projecting the fitted training polyhedron into the training 2D measurement.

18. The computer-readable medium of claim 15, wherein the object detector is further trained by, for the training property:

determining training shape parameter values for each fitted training polyhedron; and training the object detector to output the training shape parameter values.

19. The computer-readable medium of claim 13, The method of wherein the extracted set of polyhedrons are selected from a set of candidate polyhedrons.

20. The computer-readable medium of claim 13, The method of wherein the shape parameter values comprise values for at least one of: position, orientation, or dimensions.

21. The computer-readable medium of claim 13, wherein the processor is configured to execute the instructions and cause the processor to:

for each polyhedron of the set of polyhedrons:

determining a 3D shape model for the polyhedron based on the set of constituent geometric shapes; and t transforming the 3D shape model based on the shape parameter values for the polyhedron; and performing a linear combination of the 3D shape models to produce the 3D roof model for the property.

* * * * *